US012515344B2

(12) United States Patent
Yamakura

(10) Patent No.: US 12,515,344 B2
(45) Date of Patent: Jan. 6, 2026

(54) ROBOT CONTROL METHOD

(71) Applicant: Panasonic Intellectual Property Management Co., Ltd., Osaka (JP)

(72) Inventor: Yuma Yamakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 278 days.

(21) Appl. No.: 18/138,913

(22) Filed: Apr. 25, 2023

(65) Prior Publication Data
US 2023/0256614 A1 Aug. 17, 2023

Related U.S. Application Data

(63) Continuation of application No. PCT/JP2021/038697, filed on Oct. 20, 2021.

(30) Foreign Application Priority Data

Oct. 30, 2020 (JP) .................... 2020-182018

(51) Int. Cl.
*B25J 9/16* (2006.01)
(52) U.S. Cl.
CPC ........... *B25J 9/1697* (2013.01); *B25J 9/1653* (2013.01)
(58) Field of Classification Search
CPC .................. B25J 9/1697; B25J 9/1653; G05B 2219/40557; G05B 2219/40584
See application file for complete search history.

(56) References Cited

U.S. PATENT DOCUMENTS 9,026,234 B2   5/2015  Suzuki
2013/0238128 A1*  9/2013  Suzuki ................. B25J 9/1697
                                                     700/258

(Continued)

FOREIGN PATENT DOCUMENTS

JP    2003-15739    1/2003
JP    2003-305675   10/2003

(Continued)

OTHER PUBLICATIONS

International Search Report issued Jan. 18, 2022 in International (PCT) Application No. PCT/JP2021/038697.

(Continued)

*Primary Examiner* — Adam R Mott
*Assistant Examiner* — Matthew C Gammon
(74) *Attorney, Agent, or Firm* — Wenderoth, Lind & Ponack, L.L.P.

(57) ABSTRACT

A robot control method is executed in a control device connected to a robot that performs a work on a work object and a sensor mounted on the robot. First, environmental information indicating a peripheral environment of the robot is calculated based on a plurality of pieces of environment sensor information acquired for the peripheral environment by using the sensor at a plurality of positions and angles. Subsequently, first sensor information is acquired by the sensor, and a first step of calculating first control information causing the robot to approach a work goal based on work goal information indicating the work goal, the environmental information, and the first sensor information is executed. Second sensor information is acquired by the sensor, and a second step of calculating second control information causing the robot to approach the work goal based on the work goal information and the second sensor information is executed.

10 Claims, 18 Drawing Sheets

(56) References Cited

U.S. PATENT DOCUMENTS

2014/0229005 A1*  8/2014  Suzuki ................... B25J 9/1692
                                                              700/254
2019/0118394 A1   4/2019  Yamada et al.
2022/0147026 A1*  5/2022  Poelman ................ B25J 9/1671

FOREIGN PATENT DOCUMENTS

| JP | 2015-3348   | 1/2015 |
| JP | 2019-77026  | 5/2019 |
| JP | 2020-146773 | 9/2020 |

OTHER PUBLICATIONS

Extended European Search Report issued Mar. 13, 2024 in European Patent Application No. 21886014.6.

* cited by examiner

ROBOT CONTROL METHOD

BACKGROUND

1. Technical Field

The present disclosure relates to a robot control method for performing a work by using a sensor mounted on a robot.

2. Description of the Related Art

Patent Literature (PTL) 1 discloses a visual recognition device for controlling a position and a posture based on image data captured by a camera. In this disclosure, a position where a work object cannot be recognized is detected in advance by the control of the position and posture by a visual servo, and is set as a prohibited region. As a result, control is performed to avoid the prohibited region, and thus, it is possible to perform movement control to a target position while reliably recognizing the work object.

PTL 1 is Unexamined Japanese Patent Publication No. 2003-305675.

SUMMARY

An object of the present disclosure is to provide a robot control method capable of executing a work while ensuring accuracy even in a case where a work object cannot be detected by a sensor.

A robot control method according to a first aspect of the present disclosure is a robot control method in a control device connected to a robot that performs a work on a work object and a sensor that is mounted on the robot. First, environmental information indicating a peripheral environment of the robot is calculated based on a plurality of pieces of environment sensor information acquired for the peripheral environment of the robot by using the sensor at a plurality of positions and angles. Subsequently, first sensor information is acquired by the sensor, and a first step of calculating first control information causing the robot to approach a work goal of the robot for the work object based on work goal information indicating the work goal, the environmental information, and the first sensor information, and transmitting the first control information to the robot is executed. Second sensor information is acquired by the sensor after the first step, and a second step of calculating second control information causing the robot to approach the work goal based on the work goal information and the second sensor information and transmitting the second control information to the robot is executed.

Furthermore, a robot control method according to a second aspect of the present disclosure is a robot control method in a control device connected to a robot that performs work on a work object and a sensor mounted on the robot. First, environmental information indicating a peripheral environment of the robot is calculated based on a plurality of pieces of environment sensor information acquired for the peripheral environment of the robot by using the sensor at a plurality of positions and angles. Subsequently, first sensor information is acquired by the sensor, and a first step of calculating first control information causing the robot to approach a work goal of the robot for the work object based on work goal information indicating the work goal, the environmental information, and the first sensor information is executed. Furthermore, second sensor information is acquired by using the sensor, and a second step of calculating second control information causing the robot to approach the work goal based on the work goal information and the second sensor information is executed. Furthermore, a third step of calculating third control information based on the first control information and the second control information and transmitting the third control information to the robot is executed.

According to the robot control method of the present disclosure, even in a case where the work object cannot be detected by the sensor, the work can be executed while ensuring accuracy.

DETAILED DESCRIPTION

[Background of Present Disclosure]

A robot that performs a work instead of a human is controlled by a control device to perform a work such as picking and placing of a work object. At this time, in order to perform precise control adapted to an environment, feedback control using information acquired from a sensor is performed. The control device controls the robot based on sensor information acquired from the sensor. As described above, the robot can perform the work adapted to the environment by using the sensor.

However, in a case where the work is actually performed by using the robot, the sensor information does not necessarily include information on the work object. For example, in a case where a camera is used as the sensor, in order for the robot to start THE work, the work object needs to appear in a captured image acquired from the camera. For this purpose, it is necessary to design a dedicated work environment and adjust an actual machine.

In a case where the sensor information is not the information on the work object, the robot cannot be controlled based on the captured image. For example, in a case where the work object is gripped, a gripping position of the work object is determined by recognizing the work object based on the sensor information. Accordingly, in a case where the work object cannot be recognized, the gripping position cannot be determined, and the work cannot be executed.

Thus, in the following exemplary embodiments, the control is executed by using not only the information on the work object but also information on a work table (object present in a peripheral environment of the robot). As a result, even in a case where the work object is not present in the sensor information, the work can be executed while ensuring accuracy.

Hereinafter, exemplary embodiments will be described in detail with reference to the drawings as appropriate. However, unnecessarily detailed description may not be described. For example, the detailed description of already well-known matters and the overlap description of substantially the same configurations may not be described. This is to avoid an unnecessarily redundant description below and to facilitate understanding by those skilled in the art.

Note that the attached drawings and the following description are provided for those skilled in the art to fully understand the present disclosure, and they are not intended to limit the subject matters described in the appended claims.

Note that, in the following exemplary embodiments, the robot control using the camera as the sensor will be described.

First Exemplary Embodiment

Hereinafter, a first exemplary embodiment will be described with reference to FIGS. 1 to 15.

[Description of Control System Diagram]

Figure 1:
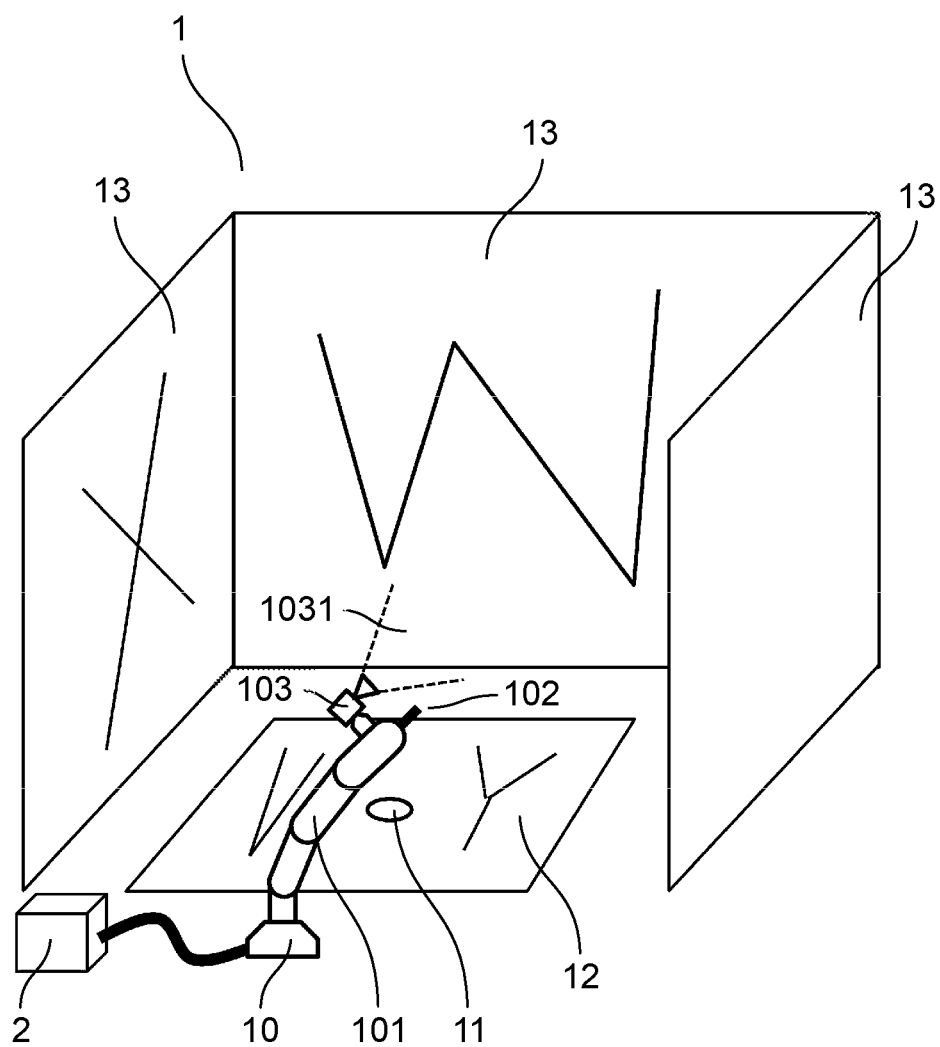
FIG. 1 is a system configuration diagram illustrating a configuration of a control system of a robot according to a first exemplary embodiment.

FIG. 1 is a system configuration diagram illustrating a configuration of a control system of a robot according to the first exemplary embodiment. Control system 1 according to the first exemplary embodiment includes at least robot 10, control device 2, bolt hole 11 as a work object, and substrate 12 and walls 13 as worktables. Control device 2 can be connected to and communicate with robot 10. Note that control device 2 may be built in robot 10. Furthermore, robot 10 includes robot arm 101, driver 102 as an end effector, and camera 103 as a sensor. Control system 1 is not limited to the configuration illustrated in FIG. 1.

Robot arm 101 includes a mechanism having one or more joints. Robot arm 101 can control a position and a posture of driver 102. Note that the robot arm does not necessarily have a joint. For example, the robot arm may include a mechanism capable of expansion and contraction. The present disclosure is not limited thereto, and the robot arm may be a robot arm that is generally used by those skilled in the art.

Driver 102 is an end effector capable of performing a work of inserting a bolt into bolt hole 11. Driver 102 is mounted at a distal end of robot arm 101. For example, as illustrated in FIG. 1, driver 102 is attached such that an orientation of a link at the distal end of robot arm 101 is parallel to an orientation of driver 102. Note that the end effector is not limited to driver 102. For example, an end effector including one or more fingers may be used as the end effector. As another example, the end effector may be a soft object having a spherical shape that can be gripped to wrap around the work object. The present disclosure is not limited thereto, and an end effector that is generally used by those skilled in the art may be used.

Camera 103 is used as a type of sensor that acquires information on a peripheral environment of robot 10. As illustrated in FIG. 1, camera 103 captures imaging range 1031 to acquire a captured image including bolt hole 11 (work object) or substrate 12 and walls 13 (work tables). Camera 103 is mounted at the distal end of robot arm 101. For example, as illustrated in FIG. 1, camera 103 is mounted to capture a portion to be worked by driver 102 by being attached to a link to which driver 102 is attached. Note that camera 103 may be attached to a portion other than the distal end of robot arm 101. For example, the peripheral environment may be captured to be rotated by being attached to a root link of robot arm 101. Note that camera 103 may also acquire information other than the captured image. For example, camera 103 may obtain parameters of camera 103. For example, camera 103 may be a depth sensor and may acquire a depth image. For example, camera 103 may be a three-dimensional distance sensor and may acquire depth information. The present disclosure is not limited thereto, and a camera that is generally used by those skilled in the art may be used as camera 103.

Bolt hole 11 (work object) is an object to be worked by using robot arm 101 or driver 102 when robot 10 performs the work. For example, as illustrated in FIG. 1, in a case where a bolt tightening work is performed, a work of robot 10 is to insert the bolt into bolt hole 11 by using driver 102.

Substrate 12 and walls 13 (work tables) are places where the work is performed, including objects present in the peripheral environment of robot 10. For example, as illustrated in FIG. 1, in a case where the bolt tightening work is performed, substrate 12 having bolt hole 11 and walls 13 surrounding a place where the work is performed are provided in the peripheral environment of robot 10.

Furthermore, the environment is a place where the work is performed including bolt hole 11 (work object), substrate 12, and walls 13 (work tables).

Other examples of the work object and the work table will be described. In control system 1, in a case where a carrying work of substrate 12 is performed, the work of robot 10 is to grip and carry substrate 12 to a designated place by using a 2-finger hand as the end effector. At this time, the work object is substrate 12. Furthermore, the work table is wall 13. As described above, even in a case where the work is performed on same control system 1, the work object and the work table may be different depending on a work content.

Note that the work table may include an object not related to the work. For example, the work table may include a ceiling. For example, the work table may include a desk different from the work table on which robot 10 is installed. That is, in a case where the captured image is acquired by camera 103, the work table refers to all objects included in imaging range 1031.

[Description of Work]

In the present exemplary embodiment, the bolt tightening work of robot 10 is considered. Robot arm 101 is a 6-axis industrial robot in which links are connected in series. Driver 102 is used as the end effector. However, it is assumed that the bolt is attached to a distal end of driver 102. Camera 103 acquires an RGB image. The work object is bolt hole 11, and the work tables are substrate 12 and walls 13. It is assumed that there are patterns on substrate 12 and walls 13 such that feature points can be extracted by image processing. In FIG. 1, this pattern is illustrated briefly. Furthermore, the environment refers to bolt hole 11, substrate 12, and walls 13.

When the bolt tightening work is executed, a posture of robot 10 at an initial time faces walls 13 as illustrated in FIG. 1. Control device 2 executes control such that robot 10 can execute the bolt tightening work by using the image captured by the camera. The posture of robot 10 when the bolt tightening work is executed, that is, a target state is a state where the posture of driver 102 is perpendicular to bolt hole 11 and the position of driver 102 is right above bolt hole 11. A schematic diagram of robot 10 in the target state will be described later with reference to FIG. 10.

[Description of Sequence Diagram]

A sequence diagram illustrates data exchange between operator S1, control device 2, robot 10, and camera 103. Operator S1 is a person who operates robot 10. Furthermore, the control device, the robot, and the camera described with reference to FIG. 1 are used as control device 2, robot 10, and camera 103.

[Sequence for Calculating Environmental Information]

Figure 2:
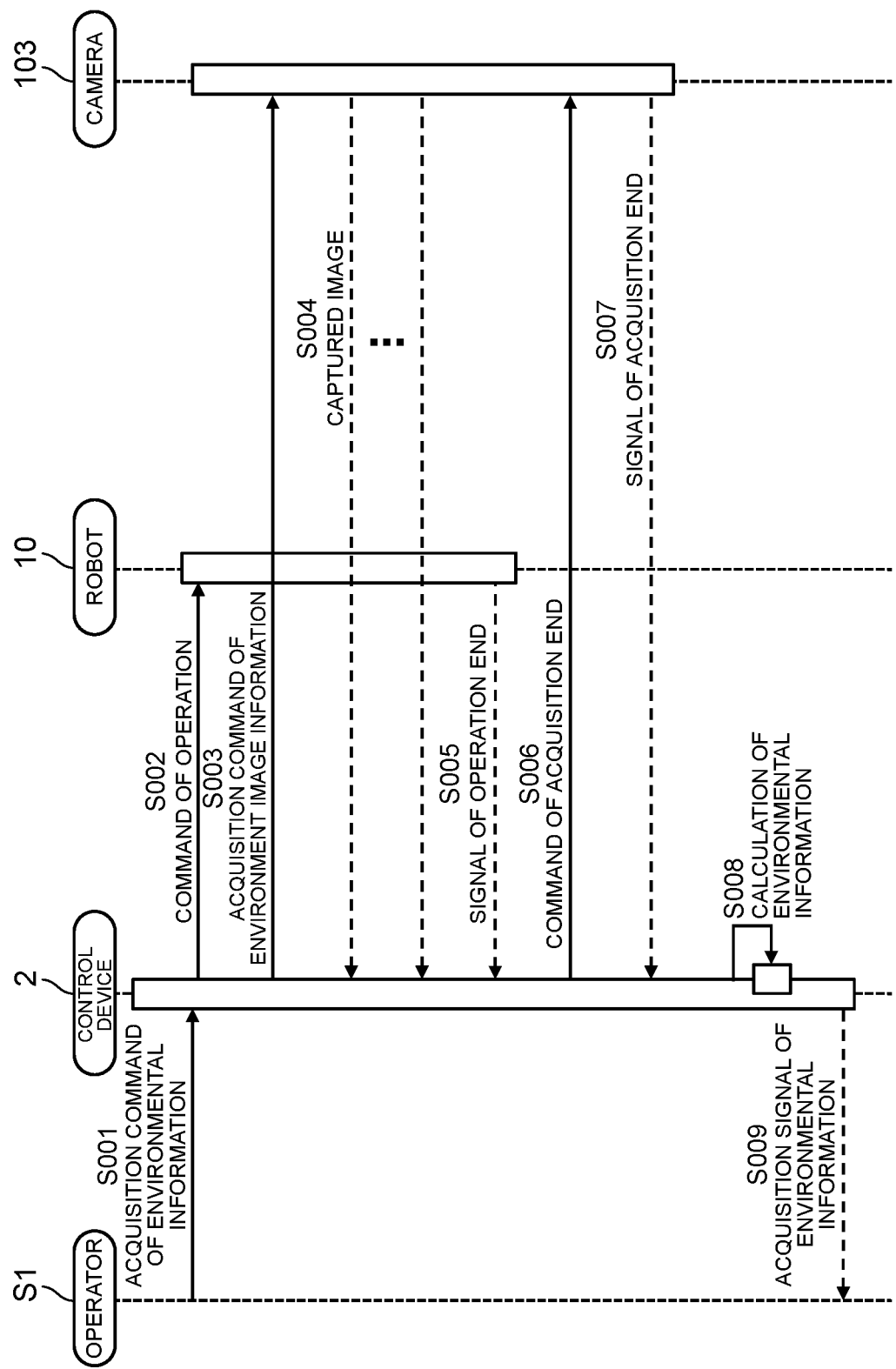
FIG. 2 is a sequence diagram illustrating an operation of calculating environmental information of the robot according to the first exemplary embodiment.

FIG. 2 is a sequence diagram illustrating an operation of calculating environmental information of the robot according to the first exemplary embodiment.

Control device 2 calculates the environmental information based on environment image information obtained by performing the image processing on the captured image acquired from camera 103. The environment image information is image information of the environment based on the captured image captured by camera 103. The environmental information is information indicating three-dimensional positional information on features of the environment. Here, since the environmental information is calculated from the environment image information, in order to accurately acquire the environmental information, it is desirable to acquire a plurality of pieces of image information of the environment from various positions and angles of camera 103. In the present exemplary embodiment, the environment image information is an image group obtained by capturing bolt hole 11, substrate 12, and walls 13, and the environmental information is a three-dimensional point group indicating three-dimensional positions of features of bolt hole 11, substrate 12, and walls 13. The captured image is an example of sensor data, and the environment image information is an example of environment sensor information.

Hereinafter, a sequence diagram for calculating the environmental information from the environment image information will be described. First, operator S1 transmits a command to acquire the environmental information to control device 2 (S001). Note that operator S1 may define and transmit a robot operation for acquiring the environment image information to control device 2. Note that, in order to acquire the environment image information, operator S1 may dynamically transmit control information to control device 2 by using a programming pendant or the like. Furthermore, operator S1 may directly move the robot by hand. As described above, operator S1 may interactively input the control information to control device 2 to operate robot 10.

After step S001, control device 2 transmits control information including an operation for acquiring the environmental information to robot 10 to operate robot 10 (S002).

Furthermore, control device 2 transmits a command to acquire the environment image information to camera 103 (S003). Note that it is not necessary to mount camera 103 on robot 10 to capture an image in order to acquire the environmental image. That is, operator S1 may hold camera 103 to acquire the captured image. Note that the order of step S002 and step S003 may be changed.

After steps S002 and S003, camera 103 acquires the captured image and transmits the captured image to control device 2, and control device 2 stores the captured image (S004). In step S004, since capturing is performed by camera 103 while control device 2 moves robot 10 in step S002, control device 2 receives captured images acquired from a plurality of positions and postures of camera 103 one by one and stores the captured images.

When robot 10 ends the operation defined in step S002, robot 10 transmits a signal indicating the end of the operation of robot 10 to control device 2 (S005).

After step S005, control device 2 transmits a command to end the capturing by camera 103 to camera 103 (S006). After step S006, camera 103 ends the capturing, and camera 103 transmits a signal indicating the end of the capturing to control device 2 (S007). At this time, control device 2 acquires environment image information obtained by comprehensively capturing the environment with camera 103.

After step S007, control device 2 calculates environmental information based on the environment image information acquired in step S004 (S008). Control device 2 stores the calculated environmental information. A method for calculating the environmental information will be described later in a calculation flow of the environmental information of FIG. 6.

After step S008, control device 2 transmits an acquisition signal of the environmental information to operator S1, and notifies that the calculation of the environmental information is ended (S009). Operator S1 receives the notification that the control device ends the calculation of the environmental information, and can execute calculation of work goal information that is a next work.

[Sequence for Calculating Work Goal Information]

Figure 3:
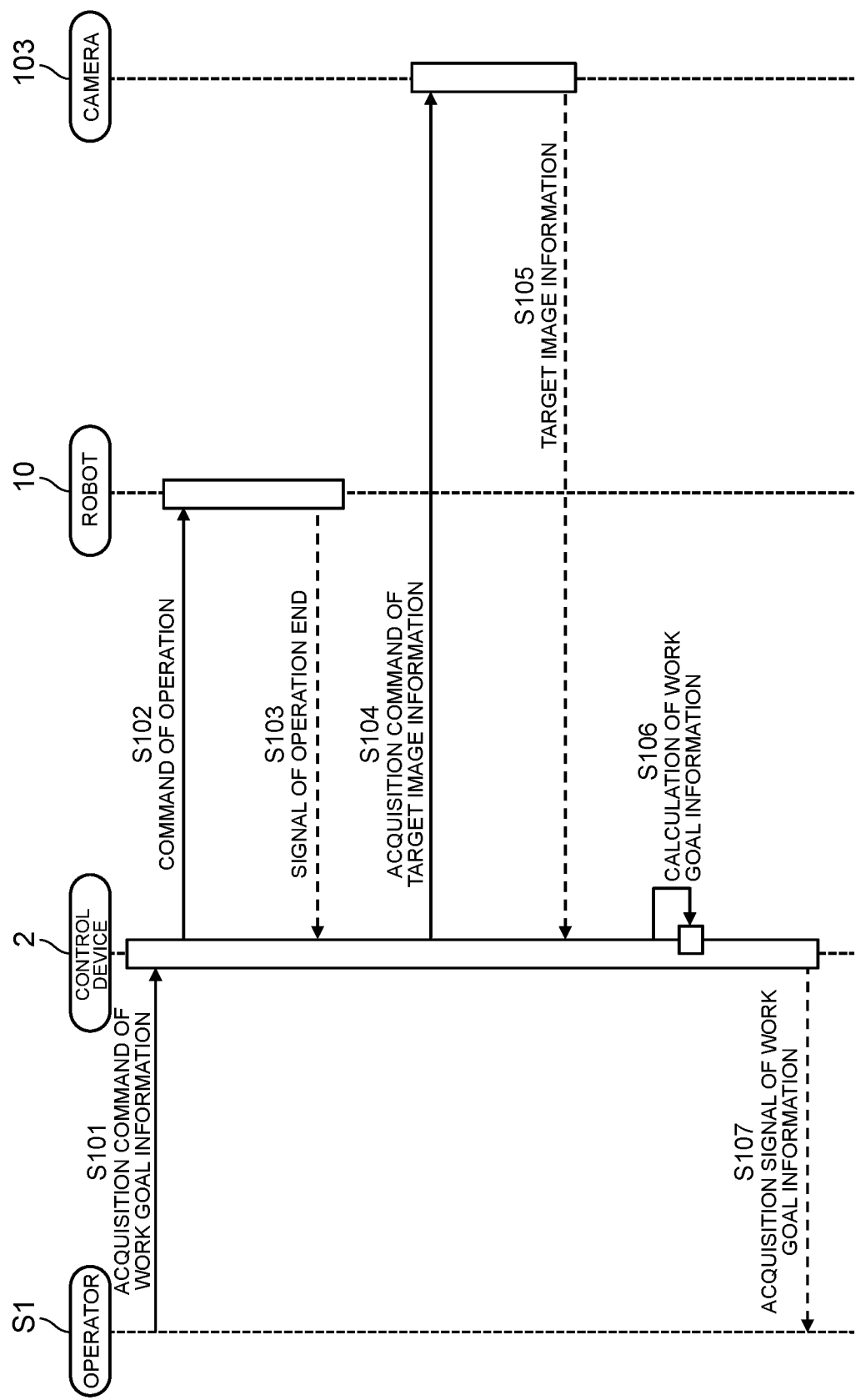
FIG. 3 is a sequence diagram illustrating an operation of calculating work goal information of the robot according to the first exemplary embodiment.

FIG. 3 is a sequence diagram illustrating an operation of calculating the work goal information of the robot according to the first exemplary embodiment. It is necessary to calculate the work goal information of robot 10 after acquiring the environmental information described with reference to FIG. 2.

Control device 2 acquires the work goal information based on the environmental information and target image information. The target image information is a captured image captured by camera 103 when the bolt tightening work is executed. The work goal information is information that is calculated by using the target image information and the environmental information and is used by robot 10 when the bolt tightening work is executed, includes the position and posture of camera 103 when the bolt tightening work is executed, and the feature point of bolt hole 11 in the target image information. The feature point is an example of feature information.

Hereinafter, a sequence diagram for calculating the work goal information from the target image information will be described. First, operator S1 transmits a command to acquire the work goal information to control device 2 (S101). Note that, operator S1 may define and transmit a robot operation for acquiring the work goal information to control device 2. Note that, in order to acquire the work goal information, operator S1 may dynamically transmit control information to control device 2 by using a programming pendant or the like. Furthermore, operator S1 may directly move the robot by hand. As described above, operator S1 may interactively input the control information to control device 2 to operate robot 10.

After step S101, control device 2 transmits a command (control information) of the operation for acquiring the target image information to robot 10 to operate robot 10 (S102).

After step S102, robot 10 transmits a notification indicating the end of the operation to control device 2 (S103). After step S103, the posture of robot 10 becomes a posture when the work is achieved.

After step S103, control device 2 transmits a command to acquire the target image information to camera 103 (S104). After step S104, camera 103 acquires the target image information and transmits the target image information to control device 2, and control device 2 stores the target image information (S105). The target image information acquired from camera 103 includes bolt hole 11. Note that it is not necessary to mount camera 103 on robot 10 to capture an image in order to acquire the target image information. That is, operator S1 may hold camera 103 to acquire the captured image.

After step S105, the work goal information is calculated based on the environmental information and the target image information (S106). A method for calculating the work goal information will be described later in a calculation flow of the work goal information of FIG. 9.

After step S106, control device 2 transmits an acquisition signal of the work goal information to operator S1, and notifies that the calculation of the work goal information is ended (S107). Operator S1 receives the notification that the control device ends the calculation of the work goal information, and can execute the control of robot 10 that is the next work.

[Sequence for Controlling Robot]

Figure 4:
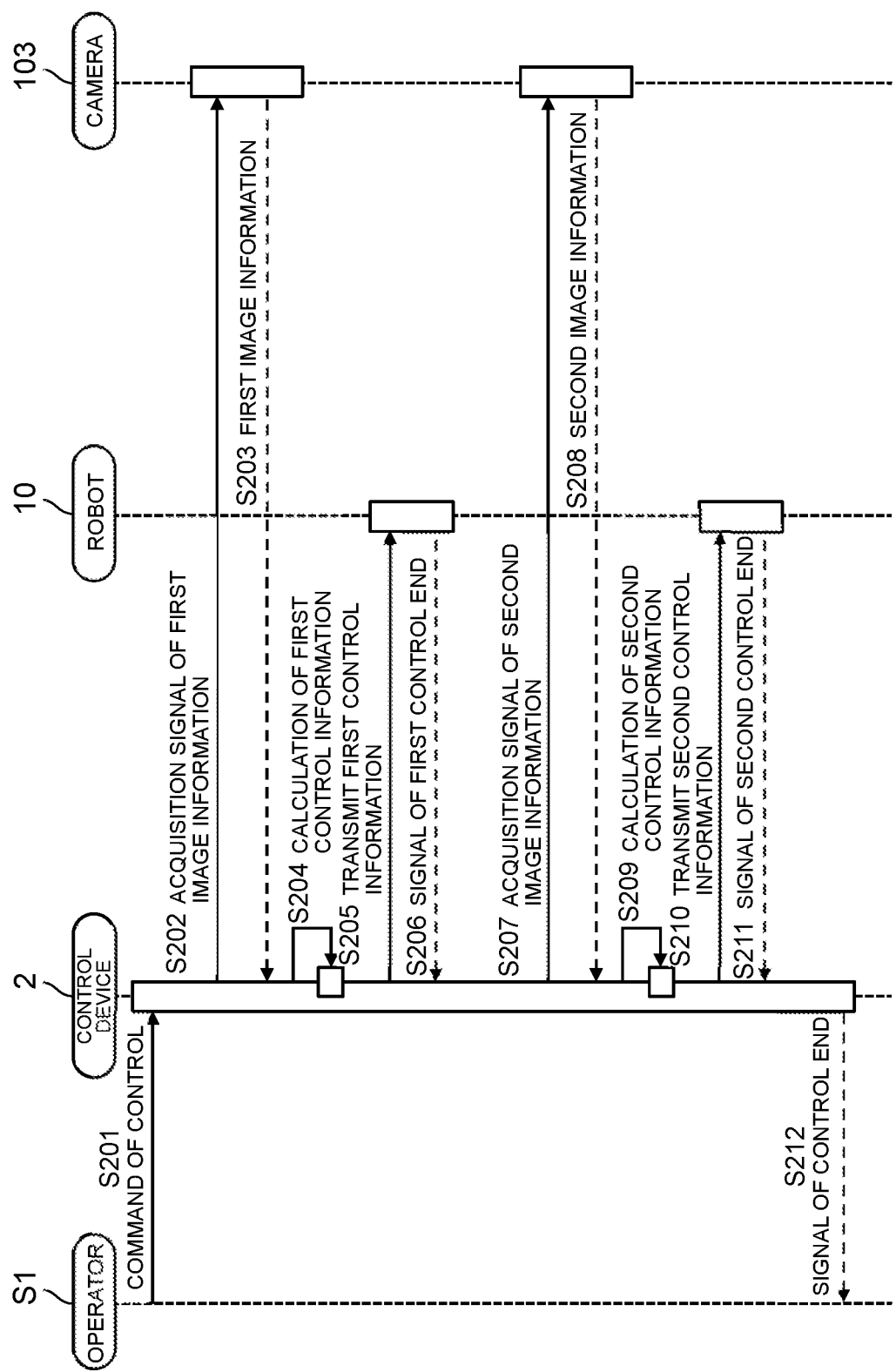
FIG. 4 is a sequence diagram illustrating a control operation for realizing a work of the robot according to the first exemplary embodiment.

FIG. 4 is a sequence diagram illustrating a control operation of realizing the work of the robot according to the first exemplary embodiment. It is necessary to control the robot after the environmental information described with reference to FIG. 2 and the work goal information described with reference to FIG. 3 are acquired.

The feature of the robot control of the present exemplary embodiment is two-stage control in which a second step is executed after a first step. The first step includes three kinds of processing. In first processing, first image information is acquired from camera 103. In second processing, the first control information is calculated based on the environmental information, the first image information, and the work goal information. In third processing, control is executed based on the first control information. The second step also includes three kinds of processing. In first processing, second image information is acquired from camera 103. In second processing, second control information is calculated based on the second image information and the work goal information. In third processing, control is executed based on the second control information. The image information is an example of sensor information.

The control by these two steps is control executed by certain single piece of target image information. In other words, results of the control by the first step and the second step are ideally the same. Unlike the second step, since the control using not only the information on the work object but also the environmental information is performed in the first step, the control can be performed even in a case where the work object is not present in the captured image. This complements a problem in the second step that the control cannot be performed in a case where the work object is not present in the captured image.

However, in the present exemplary embodiment, since a two-dimensional image is converted into three-dimensional positional information when the environmental information is calculated, an error may occur in conversion into the environmental information. Thus, there is a possibility that the error due to the conversion occurs in the control of the first step. On the other hand, unlike the first step, in the second step, the feature of the two-dimensional image is directly used without converting the two-dimensional image, and the error due to the conversion described above does not occur. That is, more accurate control can be performed in the second step than in the first step.

Accordingly, in the present exemplary embodiment, the control by the second step is executed after the control by the first step. The control by the first step is executed first, and thus, the work object appears in the captured image from a case where the work object is not present in the captured image. Accordingly, the second step can be executed next. Subsequently, the control by the second step is executed in consideration of the error in the conversion into the environmental information, and thus, robot 10 is precisely controlled to achieve the work goal information from the case where the feature of the work object is present in the captured image. As a result, the precise control is executed regardless of a position of the work object.

In the present exemplary embodiment, the first image information is a feature point of an image obtained by capturing the environment acquired from camera 103. Furthermore, the second image information is a feature point of bolt hole 11 of the captured image acquired from camera 103. Furthermore, the first control information and the second control information are control amounts of positions of joint angles of robot 10, and robot 10 executes position control of the joint angles by using the control information.

First, operator S1 transmits a command to start control of the robot to control device 2 (S201).

After step S201, control device 2 transmits a command to acquire the first image information to camera 103 (S202). After step S202, camera 103 acquires the first image information and transmits the first image information to control device 2, and control device 2 stores the first image information (S203).

After step S203, control device 2 calculates the first control information based on the environmental information, the work goal information, and the first image information (S204). A method for calculating the first control information will be described later in a calculation flow of the control operation of the robot in FIG. 14.

After step S204, control device 2 transmits the first control information to robot 10 (S205). After step S205, robot 10 is controlled based on the received control information, and then transmits an end signal of first control to control device 2 (S206).

After step S206, control device 2 transmits a command to acquire the second image information to camera 103 (S207). After step S207, camera 103 acquires the second image information, transmits the second image information to control device 2, and stores the second image information in control device 2 (S208).

After step S208, control device 2 calculates the second control information based on the work goal information and the second image information (S209). A method for calculating the second control information will be described later in a calculation flow of the control operation of the robot in FIG. 14.

After step S209, control device 2 transmits the second control information to robot 10 (S210). After step S210, robot 10 is controlled based on the received second control information, and then transmits an end signal of second control to control device 2 (S211).

After step S211, control device 2 transmits an end signal of the control to operator S1 to notify that the control of robot 10 is ended (S212).

Note that the sequences may be sequentially executed by operator S1 without transmitting the commands.

[Description of Block Diagram]

Figure 5:
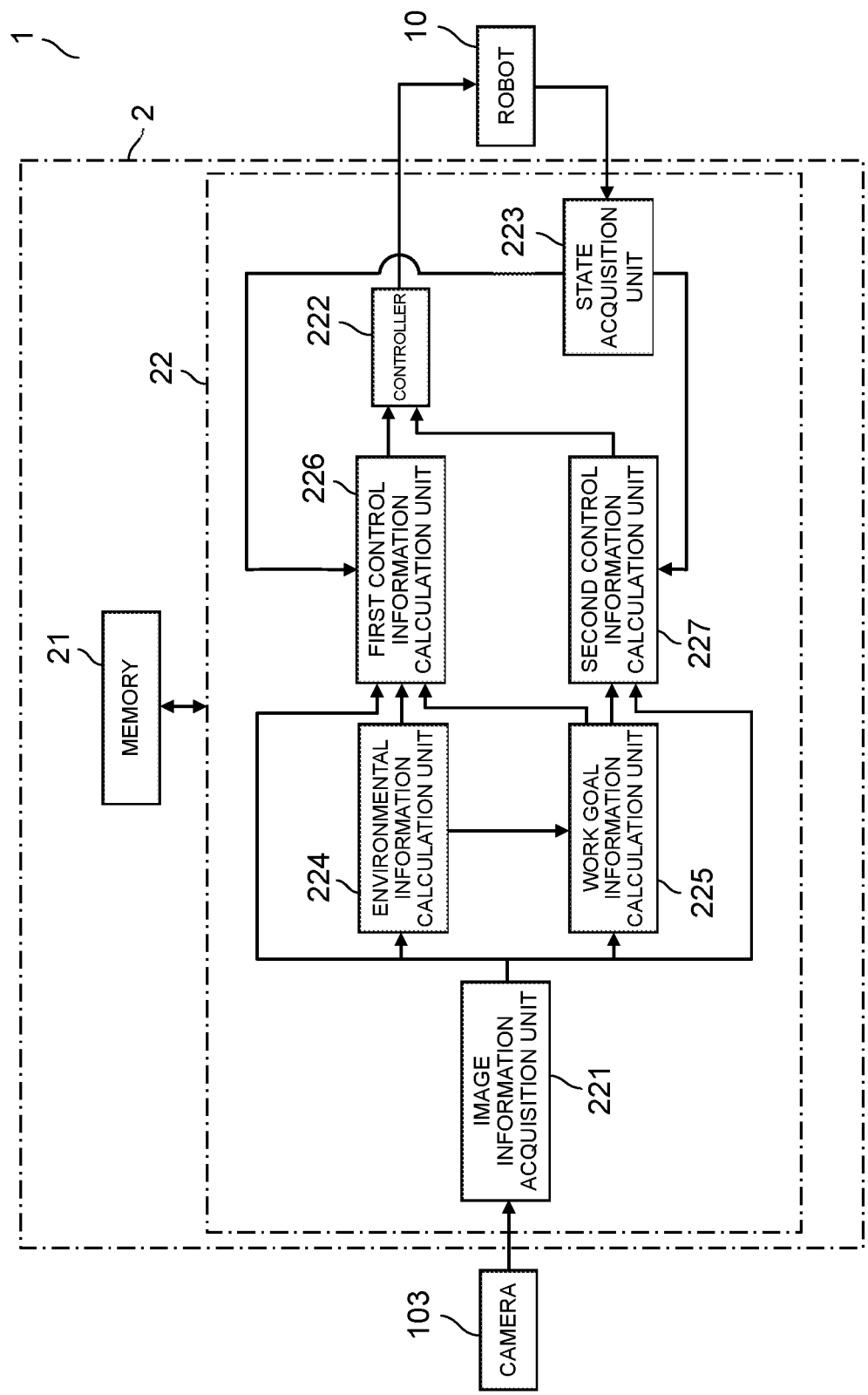
FIG. 5 is a block diagram illustrating a hardware configuration of the control system according to the first exemplary embodiment.

FIG. 5 is a block diagram illustrating a hardware configuration of control system 1 of robot 10 according to the first exemplary embodiment. Since robot 10 and camera 103 are similar to the robot and the camera described with reference to FIG. 1, the description thereof will be omitted.

Memory 21 stores information for executing processing by processor 22. The memory includes, for example, a random access memory (RAM) and a read only memory (ROM). The RAM is a working memory for temporarily storing data generated or acquired by processor 22. The ROM is a storage for storing a program that defines processing by processor 22. For example, memory 21 may store the captured image, the environment image information, the target image information, the first image information, and the second image information acquired from image information acquisition unit 221, the environmental information acquired from environmental information calculation unit 224, and the work goal information acquired from work goal information calculation unit 225. Furthermore, memory 21 may store data in processing of each acquisition unit and calculation unit. Furthermore, memory 21 may store parameters of camera 103 and robot 10.

Processor 22 refers to a program stored in memory 21 and executes the program to execute processing. For example, processor 22 is formed by using a central processing unit (CPU) or a field programmable gate array (FPGA). For example, processor 22 functionally realizes image information acquisition unit 221, controller 222, state acquisition unit 223, environmental information calculation unit 224, work goal information calculation unit 225, first control information calculation unit 226, and second control information calculation unit 227.

Image information acquisition unit 221 acquires the captured image captured by camera 103 from camera 103. Image information acquisition unit 221 can execute first image processing of extracting the features of the environment and second image processing of extracting the features of bolt hole 11. Here, the first image processing is image processing for the control by the first step, and the second image processing is image processing for the control by the second step.

When the environmental information is calculated, image information acquisition unit 221 executes the first image processing on a captured image group to calculate the environment image information, and stores the environment image information in memory 21. When the work goal information is calculated, image information acquisition unit 221 calculates first target image information and second target image information by executing the first image processing and the second image processing on the captured images. When the first control information is calculated, image information acquisition unit 221 calculates the first image information by executing the first image processing on the captured image. When the second control information is calculated, image information acquisition unit 221 calculates the second image information by executing the second image processing on the captured image. Note that image information acquisition unit 221 may store data calculated in each processing in memory 21. Note that image information acquisition unit 221 may acquire the parameters of camera 103 from camera 103 and store the parameters of camera 103 in memory 21.

Controller 222 acquires the first control information or the second control information from first control information calculation unit 226 or second control information calculation unit 227. Controller 222 converts the first control information or the second control information into a control signal that can be received by robot 10. Controller 222 transmits the control signal to robot 10. When the control signal is received, robot 10 operates according to the received control signal. For example, when controller 222 acquires a numerical array of the positions of the joint angles as the first control information or the second control information, controller 222 converts the control information into a control signal represented by a character string and transmits the control signal to robot 10. The present disclosure is not limited thereto, and the control information and the control signal that are generally used by those skilled in the art may be used.

State acquisition unit 223 acquires a state of robot 10 from robot 10. State acquisition unit 223 stores the acquired state of robot 10 in memory 21. Note that state acquisition unit 223 may acquire the parameters of robot 10 from robot 10 and store the parameters of robot 10 in memory 21.

Environmental information calculation unit 224 acquires the environmental information based on the environment image information acquired from image information acquisition unit 221. Environmental information calculation unit 224 stores the acquired environmental information in memory 21.

work goal information calculation unit 225 acquires first work goal information based on the first target image information and the environmental information acquired from image information acquisition unit 221. work goal information calculation unit 225 acquires second work goal information based on the second target image information acquired from image information acquisition unit 221. The first work goal information and the second work goal information are combined as work goal information. work goal information calculation unit 225 stores the acquired work goal information in memory 21. Here, the first work goal information is work information for the control by the first step, and the second work goal information is work information for the control by the second step.

First control information calculation unit 226 calculates the first control information for controlling robot 10 based on the first image information, the environmental information, and the first work goal information acquired from image information acquisition unit 221. First control information calculation unit 226 stores the calculated first control information in memory 21. Note that first control information calculation unit 226 may also calculate the first control information based on the state of robot 10 acquired by state acquisition unit 223.

Second control information calculation unit 227 calculates the second control information for controlling robot 10 based on the second image information acquired from image information acquisition unit 221 and the second work goal information. Second control information calculation unit 227 stores the calculated second control information in memory 21. Note that second control information calculation unit 227 may also calculate the second control information based on the state of robot 10 acquired by state acquisition unit 223.

Control device 2 may further include component elements other than memory 21 and processor 22. For example, an input device for instructing processing and a functional block for instructing the processor to perform processing in accordance with an input may be further included. For example, an output device for outputting processing and a functional block for referring to information to be output may be further included. For example, control device 2 may further include a functional block that acquires a control signal issued by the programming pendant, calculates the control information, and transmits the control information to controller 222. For example, control device 2 may further include a communication device for connecting to the Internet and a functional block that performs processing in accordance with a communication signal.

[Description of Flowchart]

In the present exemplary embodiment, an operation for realizing the work of the robot will be described with reference to a flowchart.

[Flow of Calculating Environmental Information]

Figure 6:
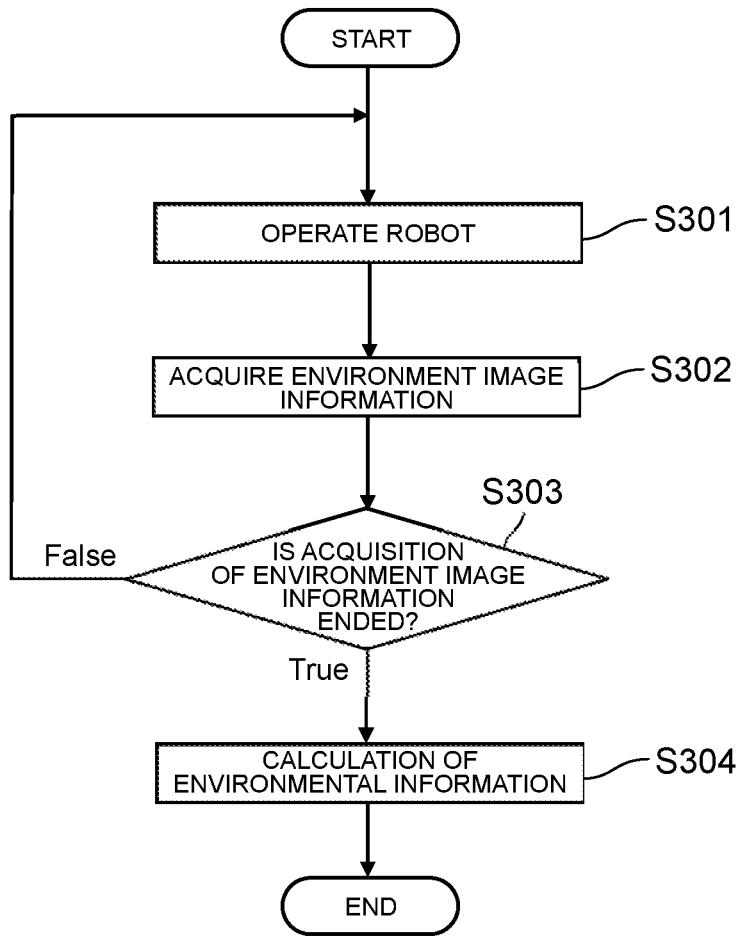
FIG. 6 is a flowchart illustrating a method for calculating the environmental information according to the first exemplary embodiment.

FIG. 6 is a flowchart illustrating a method for calculating the environmental information according to the first exemplary embodiment.

First, controller 222 operates robot 10 (S301).

After step S301, environmental information calculation unit 224 acquires, from image information acquisition unit 221, the environment image information obtained by the first image processing from the captured image captured by camera 103 (S302).

Note that known methods for realizing the first image processing include edge detection, corner detection, Hough transform, Signature of Histograms of OrienTations (SHOT), Features from Accelerated Segment Test (FAST), and Speeded-Up Robust Features (SURF). The first image processing is desirably general-purpose image processing in order to acquire information of a wide range of the environment.

After step S302, it is further determined whether or not to end the acquisition of the environment image information (S303). For example, kinds of processing for acquiring the environment image information are described in advance, and the kinds of processing are sequentially performed. In a case where all the kinds of processing are ended (S303: True), the acquisition of the environment image information is ended, and otherwise (S303: False), the environment image information is further acquired.

In a case where the kinds of processing for acquiring the environment image information are not ended and the environment image information is acquired (S303: False), the processing returns to step S301. The kinds of processing of steps S301 and S302 are repeated, and thus, a plurality of pieces of environment image information for calculating the environmental information are acquired in step S304 to be described later.

Figure 7:
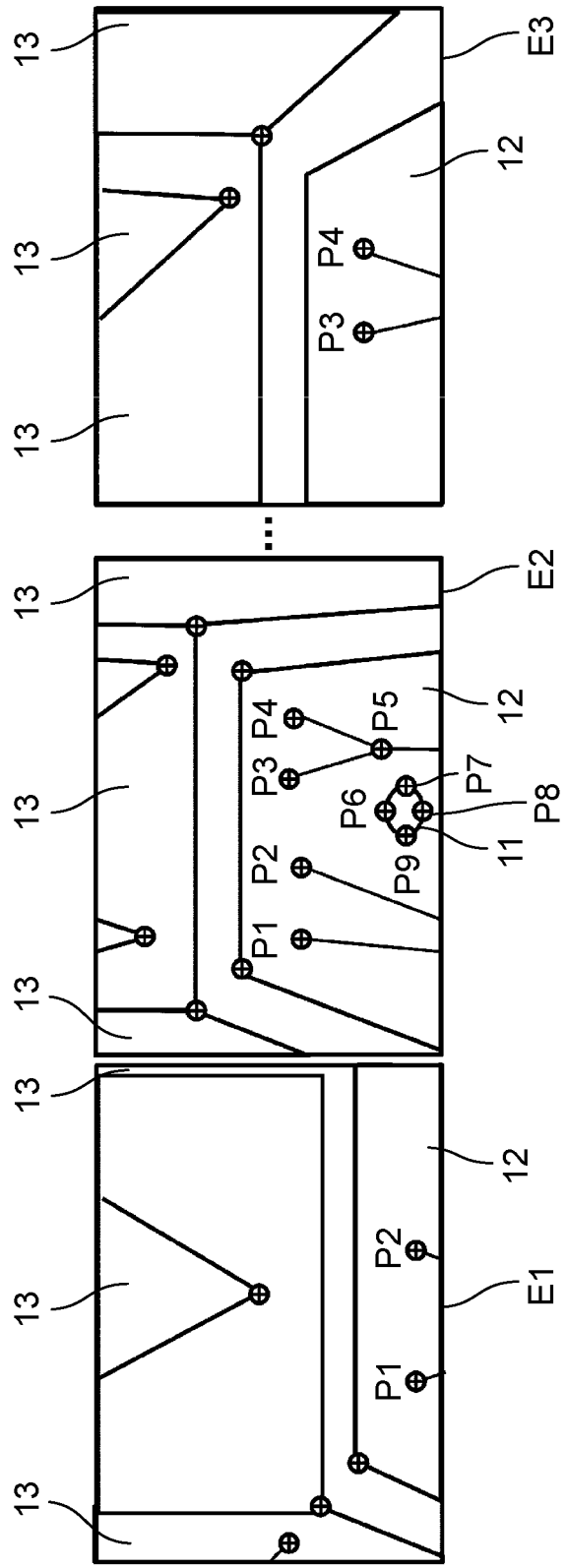
FIG. 7 is a schematic diagram illustrating environment image information according to the first exemplary embodiment.

FIG. 7 is a schematic diagram illustrating the environment image information according to the first exemplary embodiment. Symbols with crosses in circles represent features in a two-dimensional space of the environment image information acquired by the first image processing. In the present exemplary embodiment, the features are four points on a circumference of bolt hole 11, vertices of substrate 12, vertices of walls 13, and an end point of the pattern, and are represented by a set of coordinate points in the two-dimensional image. The environment image information is expressed by drawing feature points on the captured image. Feature points P1 to P9 are points of particular attention for description among the acquired feature points. Although pieces of environment image information E1 to E3 based on three captured images have been described as an example, more captured images are actually acquired as necessary.

After step S302 in FIG. 6, in a case where the acquisition of the environment image information is ended (S303: True), environmental information calculation unit 224 calculates the environmental information based on the environment image information (S304). Note that a moving image obtained by capturing the environment may be acquired in advance, and the acquired moving image may be converted into a plurality of images and used as the environment images. Note that the environmental information may be updated online while an environmental image is added in the middle and the environmental image is added by camera 103.

Note that, as a known method for calculating the environmental information, there are Simultaneous Localization And Mapping (SLAMs). The SLAM is a technique for simultaneously performing self-position estimation of a sensor and map generation based on information acquired by the sensor. Among the SLAMs, as a feature based method using image feature points, there are PTAM and ORB-SLAM. Among the SLAMs, as a direct method using luminance of the entire image, there are DTAM, LSD-SLAM, DSO, and SVO.

Figure 8:
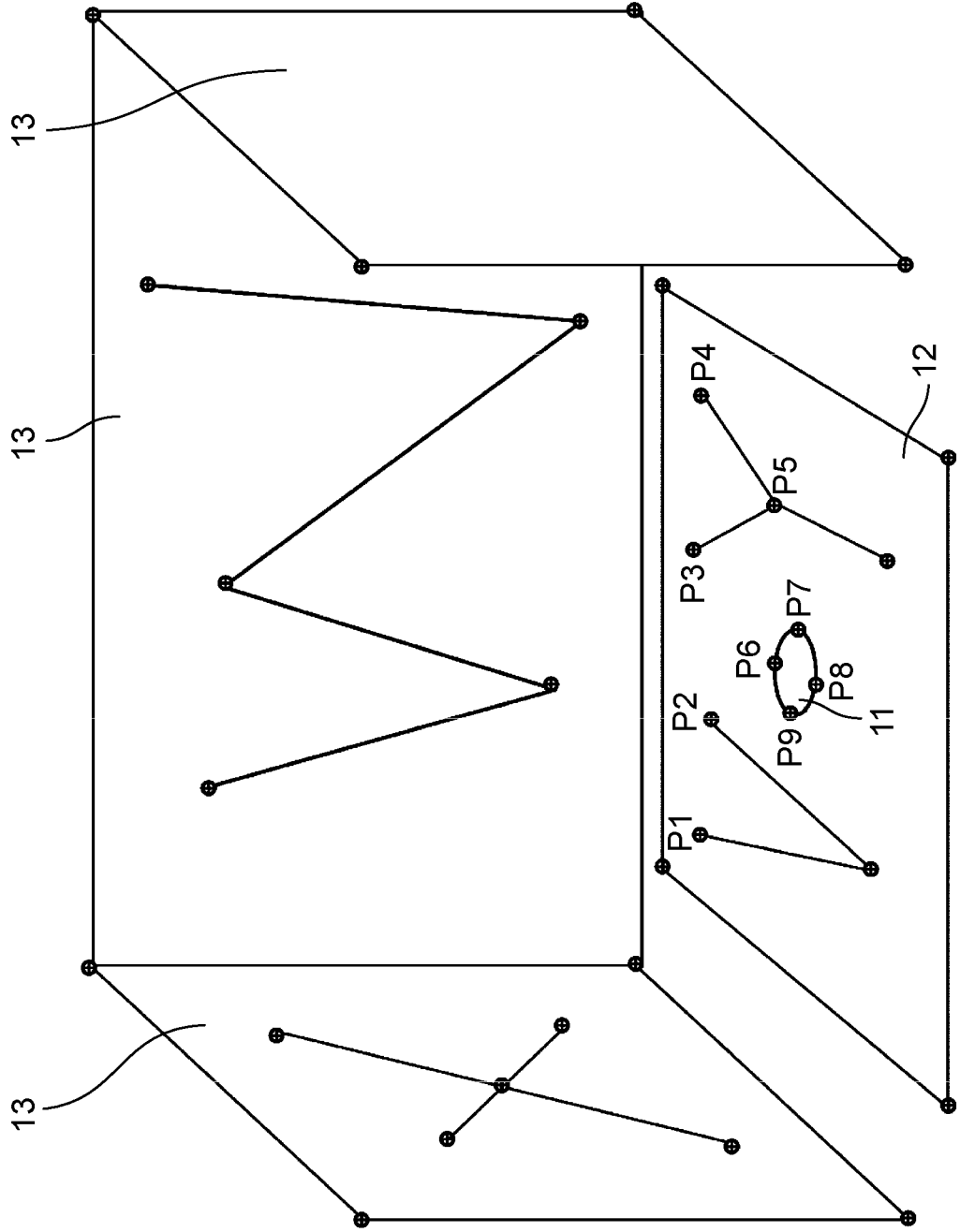
FIG. 8 is a schematic diagram illustrating environmental information of the robot according to the first exemplary embodiment.

FIG. 8 is a schematic diagram illustrating the environmental information of the robot according to the first exemplary embodiment. Symbols with crosses in circles are three-dimensional point group of the environmental information. The environmental information is expressed by drawing the feature points on the environment illustrated in FIG. 1. Feature point P1 of the three-dimensional point group indicated in the environmental information of FIG. 8 is calculated based on feature point P1 of environment image information E1 of FIG. 7 and feature point P1 of environment image information E2. Similarly, feature point P3 of the three-dimensional point group indicated in the environmental information of FIG. 8 is calculated based on feature point P3 of environment image information E2 of FIG. 7 and feature point P3 of environment image information E3. As described above, the features points are converted into the environmental information represented by the feature points of the three-dimensional point group based on the feature points of the plurality of pieces of environment image information.

[Flow of Calculating Work Goal Information]

Figure 9:
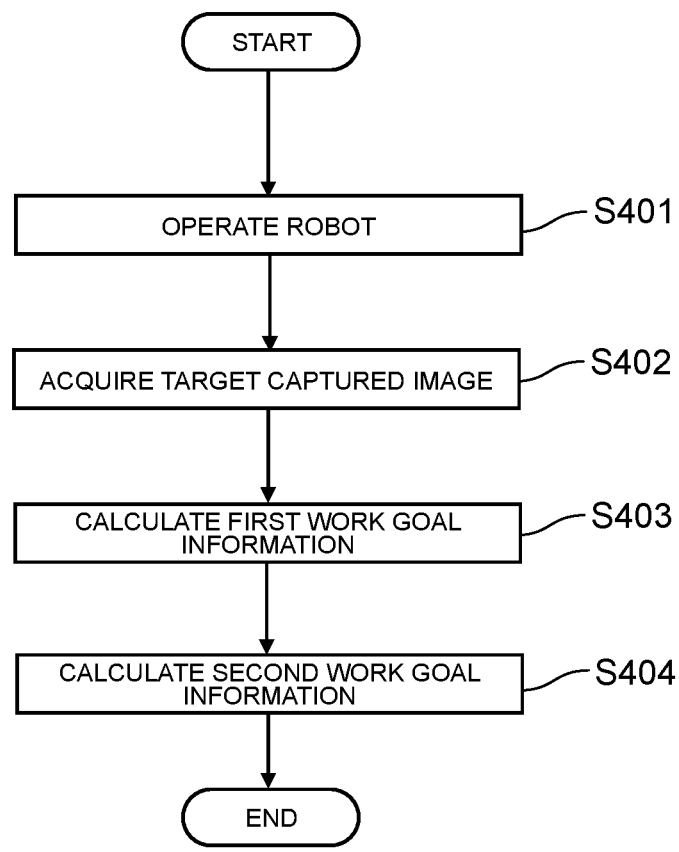
FIG. 9 is a flowchart illustrating calculation of work goal information according to the first exemplary embodiment.

FIG. 9 is a flowchart illustrating a method for calculating the work goal information according to the first exemplary embodiment. The work goal information is calculated after the environmental information is calculated, and is performed by using the calculated environmental information and the target captured image. The work goal information includes the first work goal information corresponding to the first target image information and the second work goal information corresponding to the second target image information.

First, controller 222 transmits the control information for acquiring the target image information to robot 10 to operate robot 10 (S401). By step S401, robot 10 takes a posture in which the work can be achieved, that is, the target state of robot 10.

Figure 10:
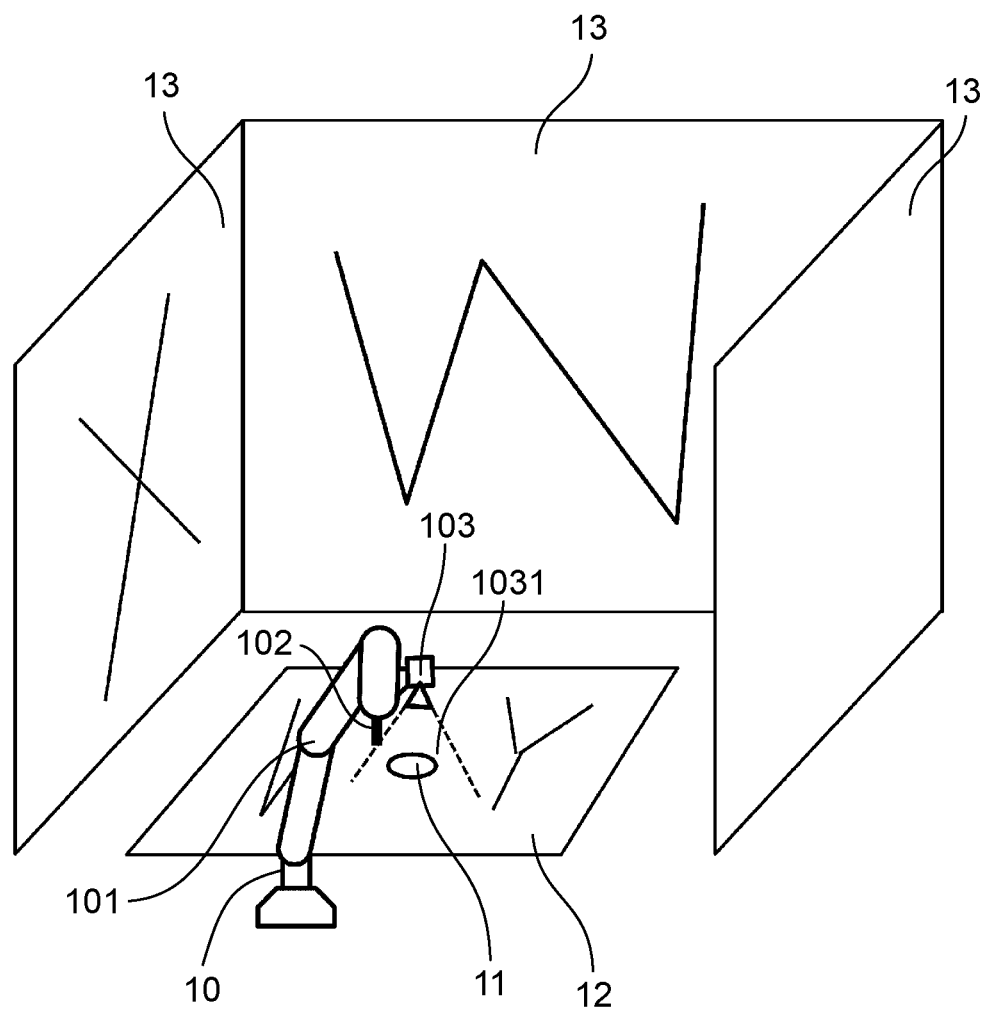
FIG. 10 is a schematic diagram illustrating a target state of the robot according to the first exemplary embodiment.

FIG. 10 is a schematic diagram illustrating the target state of the robot according to the first exemplary embodiment.

After step S401 in FIG. 9, image information acquisition unit 221 acquires the captured image captured by camera 103 (S402). This is referred to as a target captured image. The target captured image may be an image other than the image when the work goal information is calculated.

Figure 11:
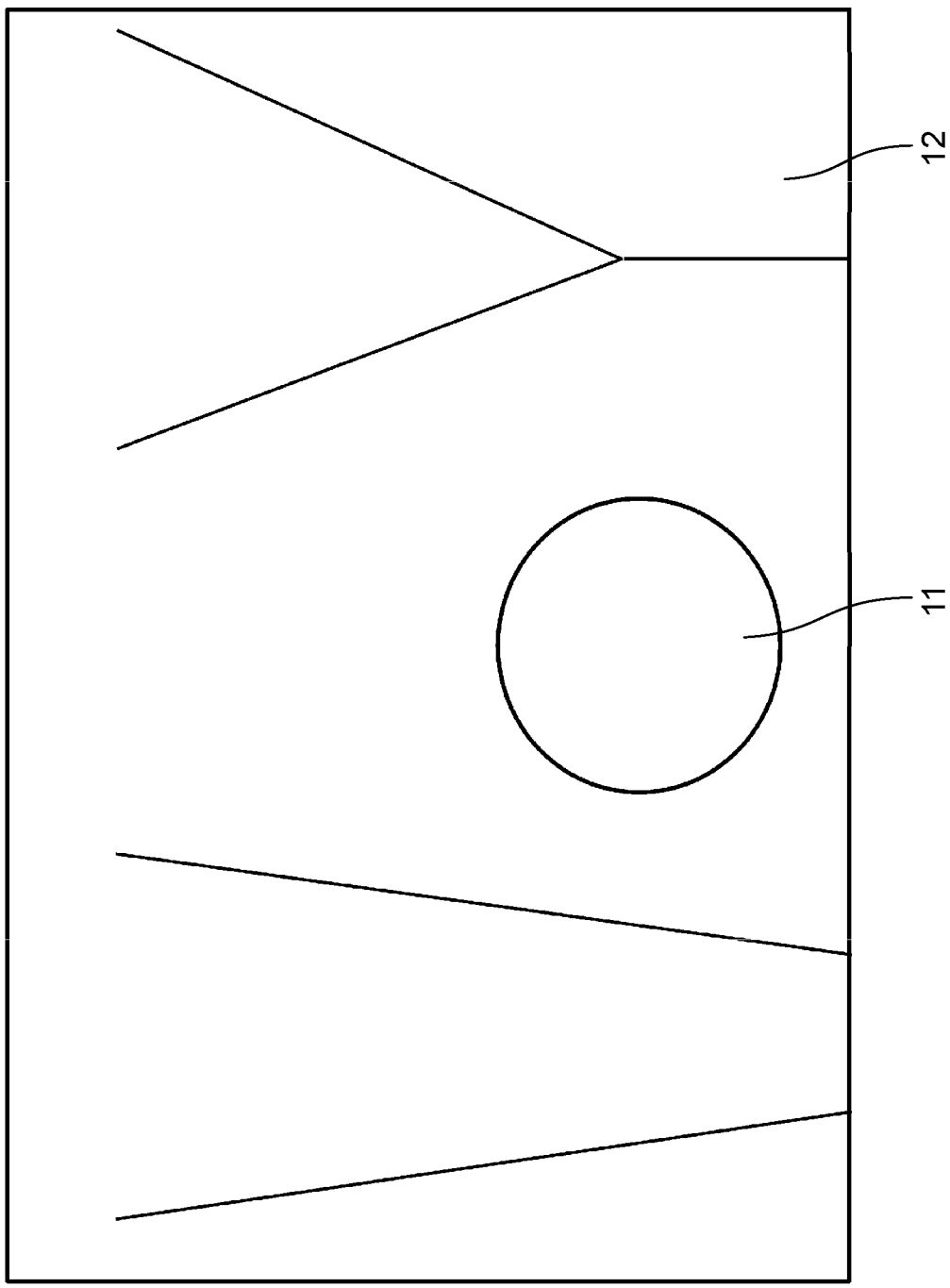
FIG. 11 is a schematic diagram illustrating a target captured image according to the first exemplary embodiment.

FIG. 11 is a schematic diagram illustrating the target captured image according to the first exemplary embodiment. Bolt hole 11 appears in the target captured image. Furthermore, substrate 12 and walls 13 may appear in the target captured image.

Figure 12:
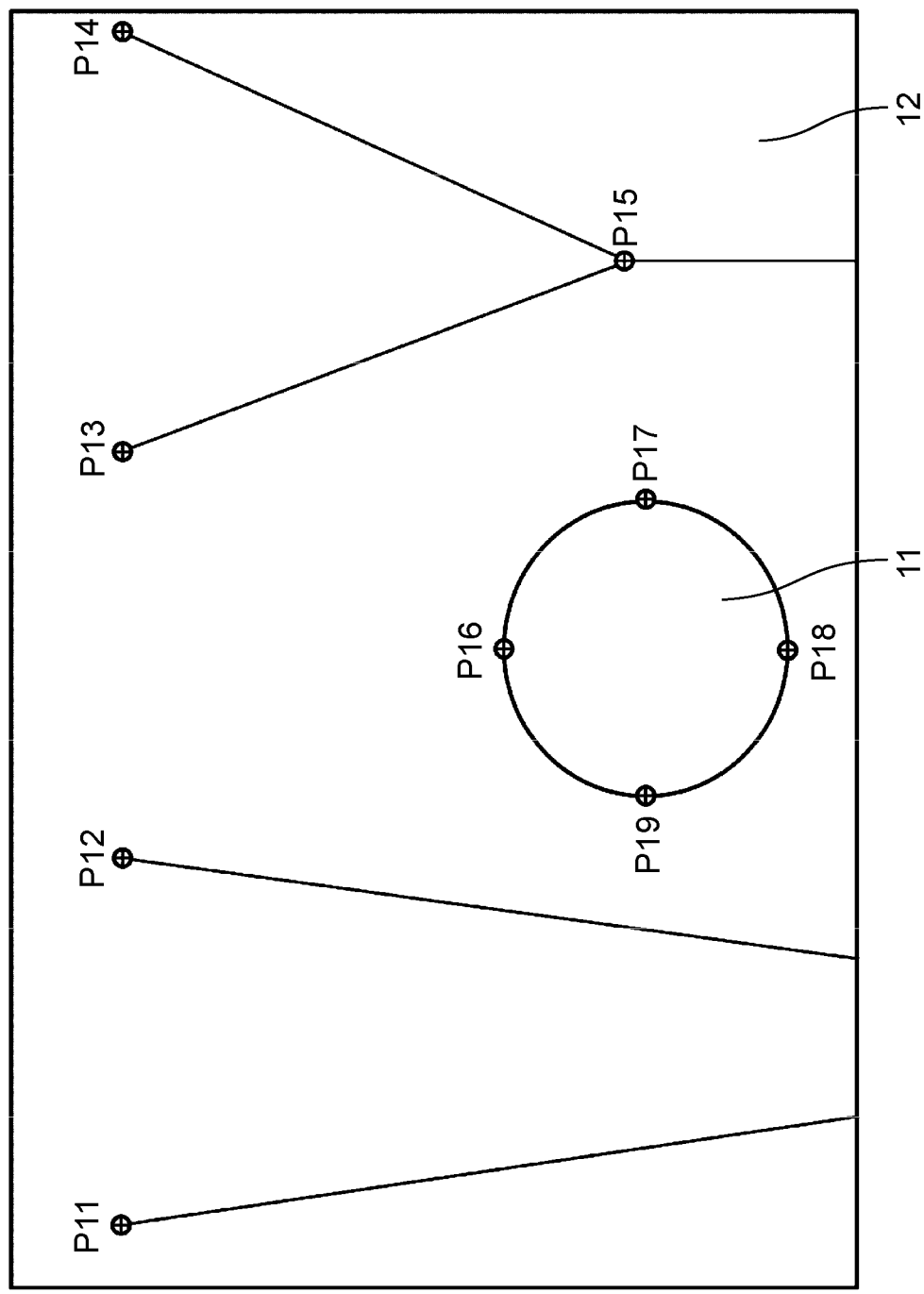
FIG. 12 is a schematic diagram illustrating first target image information according to the first exemplary embodiment.

After step S402 in FIG. 9, image information acquisition unit 221 calculates the first target image information based on the environmental information and the target captured image, and work goal information calculation unit 225 calculates the first work goal information based on the environmental information and the first target image information (S403). FIG. 12 is a schematic diagram illustrating first target image information according to the first exemplary embodiment. Symbols with crosses in circles in FIG. 12 represent features in a two-dimensional space obtained by processing the target captured image by the first image processing. The feature is drawn on the target image described with reference to FIG. 11. Feature points P11 to P19 are feature points extracted by the first image processing based on the target captured image. The first image processing is image processing used when environmental information is acquired.

The first work goal information is calculated by associating feature points P1 to P9 in FIG. 8 with feature points P11 to P19 in FIG. 12 based on the environmental information as illustrated in FIG. 8 and the first target image information as illustrated in FIG. 12. With such association, it is possible to calculate the position and posture of the camera in FIG. 8 when FIG. 12 is imaged, and the position and posture of the camera obtained by the processing is the first work goal information. As a known method for calculating the first work goal information, SLAM is exemplified.

After step S403 in FIG. 9, image information acquisition unit 221 calculates second target image information based on the target captured image, and work goal information calculation unit 225 calculates second work goal information based on the second target image information (S404).

Figure 13:
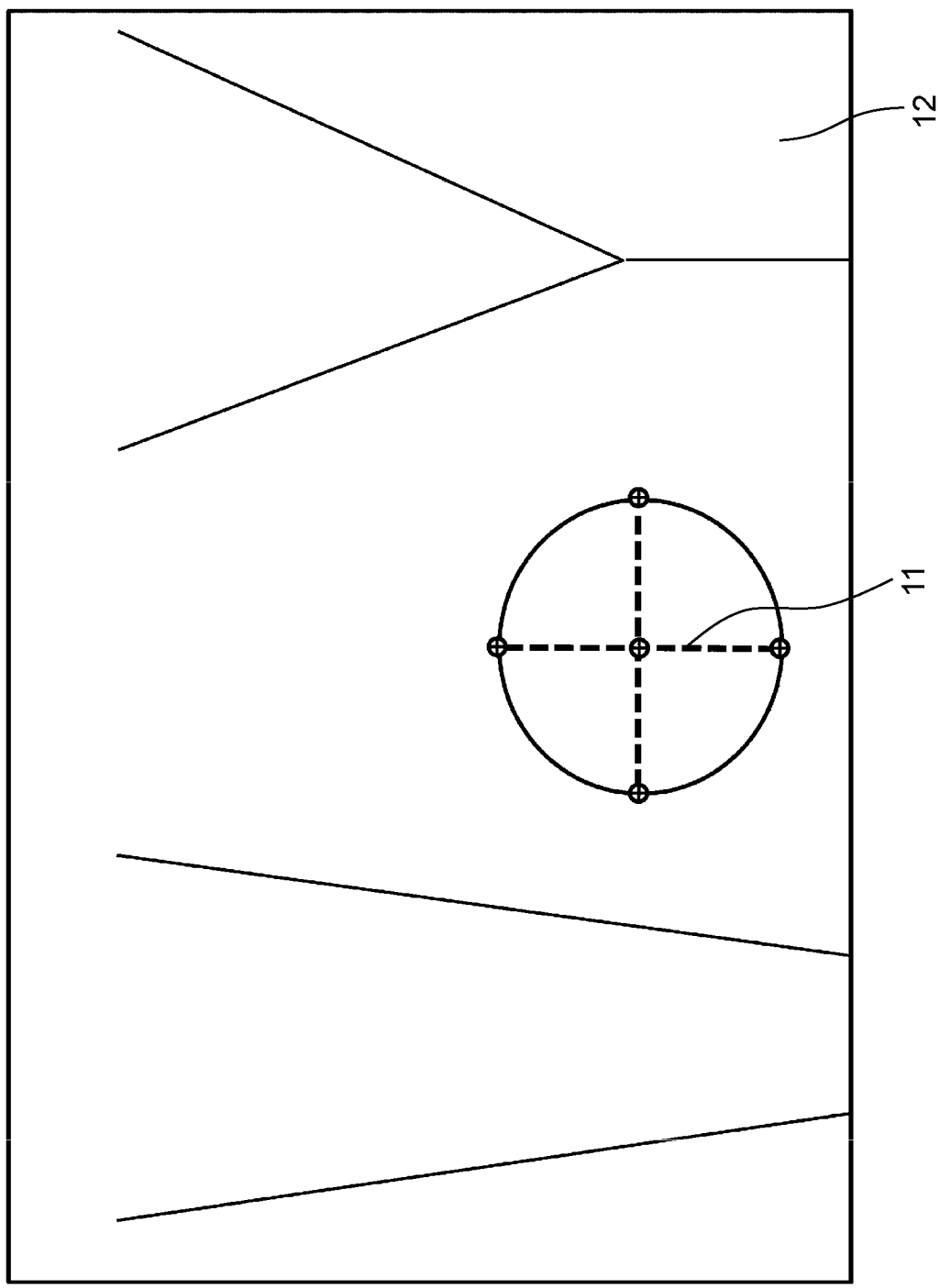
FIG. 13 is a schematic diagram illustrating second target image information according to the first exemplary embodiment.

FIG. 13 is a schematic diagram illustrating second target image information according to the first exemplary embodiment. Symbols with crosses in circles in FIG. 13 represent features in a two-dimensional space obtained by processing the target captured image by the second image processing. The feature is drawn on the target image described with reference to FIG. 11. The second image processing is image processing focusing on the work object (bolt hole 11).

The second image processing according to the present exemplary embodiment focuses on bolt hole 11 and extracts the feature point thereof. Specifically, an intersection point between center coordinates of bolt hole 11 and contours of a major axis and a minor axis of bolt hole 11 when bolt hole 11 is recognized as an ellipse is extracted as the feature of bolt hole 11 extracted in the second image processing.

Note that known methods for realizing the second image processing include Hough transformation and marker detection. The second image processing is desirably limited image processing that acts only on the work object (bolt hole 11) in order to acquire local information of the work object (bolt hole 11).

As the second work goal information, the second target image information is used as it is. Note that the second work goal information may be separately calculated based on the second target image information. For example, when the second target image information is a set of feature points in the two-dimensional space, a feature point to be used may be selected from among the feature points, and the other feature points may not be used.

[Flow of Controlling Robot]

Figure 14:
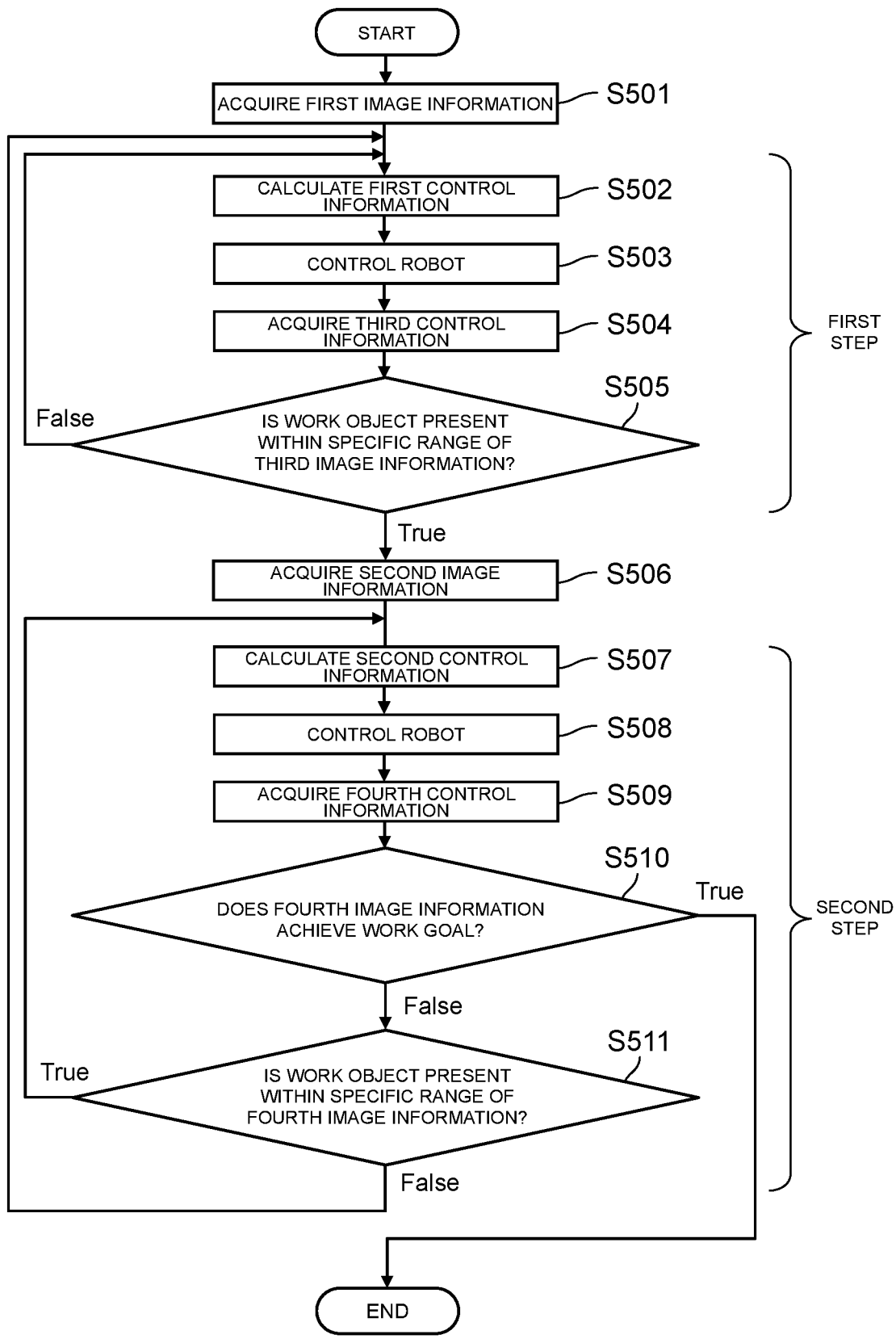
FIG. 14 is a flowchart illustrating a control operation of the robot according to the first exemplary embodiment.

FIG. 14 is a flowchart illustrating the control operation of the robot according to the first exemplary embodiment. The robot is controlled after the environmental information and the work goal information are calculated.

First, image information acquisition unit 221 acquires the captured image, executes the first image processing on the acquired captured image, and acquires the first image information (S501).

Figure 15:
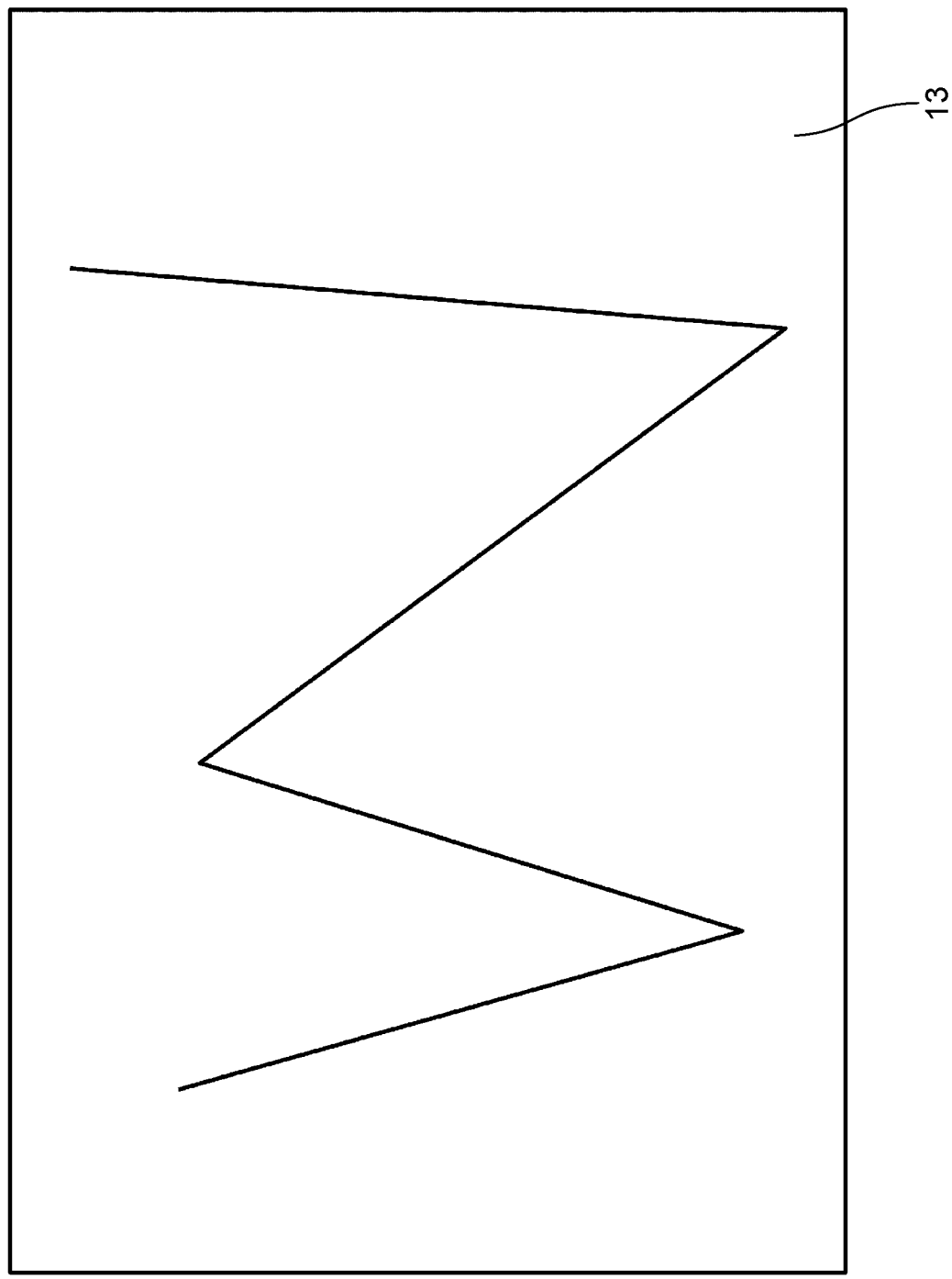
FIG. 15 is a schematic diagram illustrating a captured image of a camera in an initial state of the robot according to the first exemplary embodiment.

FIG. 15 is a schematic diagram illustrating the captured image of camera 103 in an initial state of robot 10 according to the first exemplary embodiment. In the initial state of robot 10, as illustrated in FIG. 1, since robot arm 101, driver 102, and camera 103 face walls 13, bolt hole 11 is not illustrated in the captured image. In a case where the first image processing is executed, the feature points can be taken from the pattern of walls 13. However, in a case where the second image processing is executed, since bolt hole 11 is not present in the captured image, the feature point of bolt hole 11 cannot be extracted. Accordingly, the control cannot be performed by the method of the related art using the feature point of bolt hole 11. Thus, in the present exemplary embodiment, the control is executed by also using the feature point of the environment.

After step S501 in FIG. 14, the control by the first step is performed (S502 to S505). First, first control information calculation unit 226 calculates the first control information based on the environmental information, the first work goal information, and the first image information (S502). A control procedure of first work information will be described below.

First, the first work information at a capturing point of time in the environmental information is acquired based on the environmental information and the first image information. Here, in the present exemplary embodiment, the work information is the position and posture of camera 103. Note that, as a known method for calculating the first work information, there is SLAM.

Thereafter, the first control information is calculated such that a difference between the first work goal information (a position and posture of a target camera in the present exemplary embodiment) and the first work information (in the case of the present exemplary embodiment, a current position and posture of the camera) becomes zero. Note that a known method for calculating the first control information includes visual servo.

After step S502, controller 222 controls robot 10 by using the calculated first control information (S503). After step S503, image information acquisition unit 221 acquires third image information as in step S501 (S504).

After step S504, processor 22 discriminates whether or not bolt hole 11 is present in the third image information acquired in step S503 (S505). For example, the second image processing is executed on the third image information, the feature point of bolt hole 11 is extracted, and the determination is "True" in a case where the feature point can be extracted, and is "False" otherwise. Specifically, the second image processing is executed on the third image information, the feature point of bolt hole 11 is extracted, and the determination is "True" in a case where the feature point is within a radius of 100 pixels from a center of the captured image, and is "False" otherwise. For example, You Only Look Once (YOLO) is used for the captured image, and the determination is "True" in a case where bolt hole 11 is present in the captured image, and is "False" otherwise.

Note that the processing in step S505 is not limited to the above description. For example, whether or not a work goal is achieved may be discriminated. For example, third work information is acquired based on the environmental information and the third image information, and the determination is "True" in a case where the third work information converges to the first work goal information, and is "False" otherwise. Specifically, when the third work information (the position and posture of the camera in the present exemplary embodiment) is compared with the first work goal information (the position and posture of the target camera in the present exemplary embodiment), the determination is "True" in a case where an error of the position of the camera is within 5 [mm] and an error of the posture of the camera is within 0.1 [rad], and is "False" otherwise.

In a case where bolt hole 11 is not present in the third image information in step S505 (S505: False), the third image information is replaced with the first image information, and the processing of the first step (S502 to S505) is executed. Since the work goal information includes information on bolt hole 11, bolt hole 11 is included in the third image information by repeatedly executing the first steps (S502 to S505).

In a case where bolt hole 11 is present in the third image information in step S505 (S505: True), image information acquisition unit 221 acquires the image information, executes the second image processing on the acquired captured image, and calculates the second image information (S506). Note that the second image information may be calculated by using the captured image used to calculate the third image information in step S504. Note that, in a case where the second image processing is executed in step S505, the second image information may be calculated by using the information at that time.

After step S506, the control by the second step is performed (S507 to S511). First, second control information calculation unit 227 calculates the second control information based on the second work goal information and the second image information (S507). A control procedure of the second work information will be described below.

The second control information is calculated such that a difference between the second work goal information (feature of an ellipse of target bolt hole 11 in the present exemplary embodiment) and current work information (feature of an ellipse of bolt hole 11 in the present exemplary embodiment) becomes zero. Note that a known method for calculating the second control information includes visual servo.

After step S507, controller 222 controls robot 10 by using the calculated second control information (S508). After step S508, image information acquisition unit 221 acquires fourth image information as in step S506 (S509).

After step S509, processor 22 discriminates whether or not the fourth image information acquired in step S509 achieves the work goal information (S510). Note that a case where the fourth image information achieves the work goal information is, for example, when an error between the feature in the second work goal information and a feature in the fourth image information is equal to or less than a certain value.

In a case where the fourth image information achieves the second work goal information in step S509 (S510: True), the control is ended. For example, when elements of the fourth image information and the second work goal information are compared with each other, the determination may be "True" in a case where an error of each element is less than one pixel, and may be made "False" otherwise.

In a case where the fourth image information does not achieve the second work goal information in step S509 (S510: False), it is discriminated whether or not bolt hole 11 is present within a specific range of the fourth image information (S511). The discrimination in step S511 may be performed similarly to step S505.

When it is discriminated in step S511 that bolt hole 11 is present within the specific range of the fourth image information (S511: True), the fourth image information is replaced with the second image information, and the processing of the second step (S507 to S511) is executed. The second step (S507 to S511) is repeated, and thus, the feature of the fourth image information converges to the work goal information.

When it is discriminated in step S511 that bolt hole 11 is not present within the specific range of the fourth image information (S511: False), the second step cannot be performed again. Accordingly, the processing returns to the first step (S502 to S505) to catch bolt hole 11 again.

[Effects and the Like]

As described above, in the present exemplary embodiment, the environmental information and the target image information are calculated in advance, the first control information is calculated based on the environmental information, the control by the first control information is executed, the second control information is calculated based on the environmental information, and the control by the second control information is executed.

As a result, even in a case where bolt hole 11 is not present in the image captured by the camera, the work can be executed while ensuring accuracy. Thus, it is possible to control the robot and cause the robot to perform the work without strictly designing the peripheral environment of the robot.

Second Exemplary Embodiment

Hereinafter, a second exemplary embodiment will be described with reference to FIGS. 16 to 18. Note that a work according to the second exemplary embodiment the second exemplary embodiment is the same as the work in the first exemplary embodiment, and thus, the description is omitted.

[Description of Sequence Diagram]

In the present exemplary embodiment, since there is no difference between the sequence diagram for calculating the environmental information and the sequence diagram for calculating the work goal information, only a control sequence of the robot will be described.

[Sequence for Controlling Robot]

Figure 16:
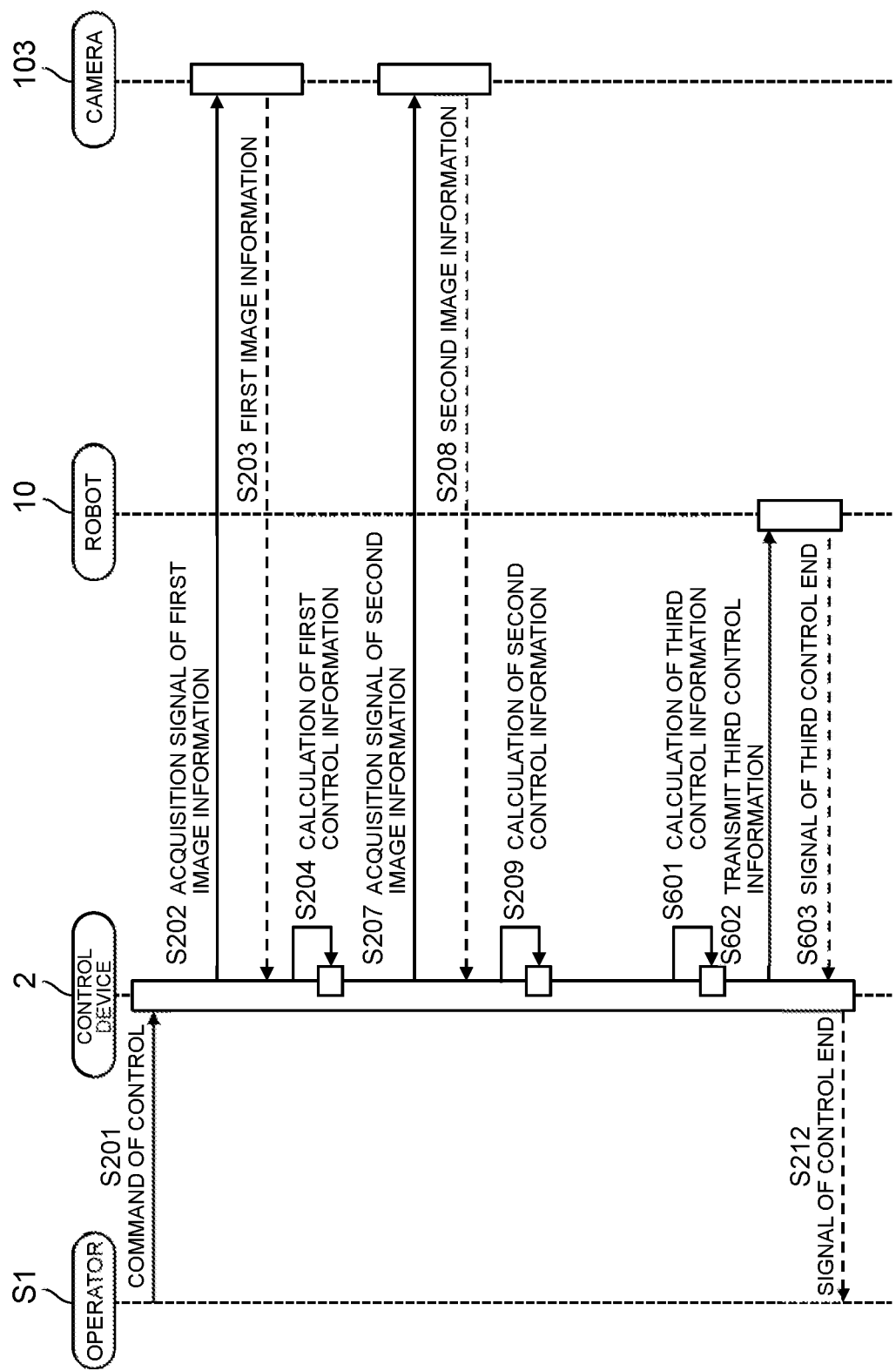
FIG. 16 is a sequence diagram illustrating a control operation for realizing a work of a robot according to a second exemplary embodiment.

FIG. 16 is a sequence diagram illustrating a control operation for realizing the work of robot 10 according to the second exemplary embodiment. Steps S201 to S204, S207 to S209, and S212 refer to FIG. 4.

After step S209, control device 2 calculates the third control information based on the first control information and the second control information (S601).

After step S601, control device 2 transmits the third control information to robot 10 (S602). After step S602, robot 10 operates based on the received control information (S603).

[Description of Block Diagram]

Figure 17:
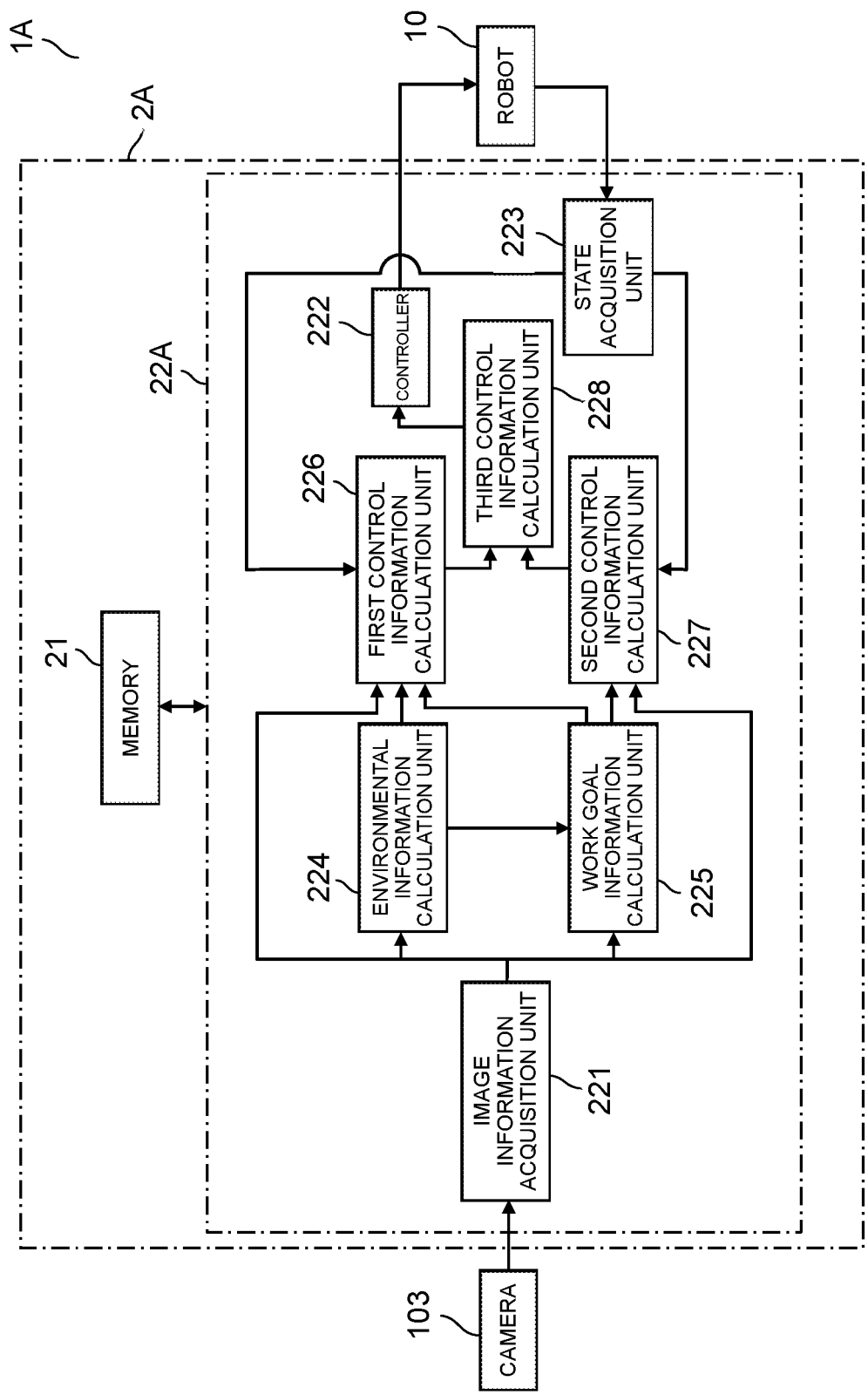
FIG. 17 is a block diagram illustrating a hardware configuration of a control system 1 of the robot according to the second exemplary embodiment.

FIG. 17 is a block diagram illustrating a hardware configuration of control system 1A of robot 10 according to the second exemplary embodiment. Control system 1A, control device 2A, and processor 22A are different from the control device and the processor of the first exemplary embodiment in including third control information calculation unit 228. The same reference marks are given to the same components as the components of the first exemplary embodiment, and the description thereof will be omitted.

Third control information calculation unit 228 calculates the third control information based on the first control information calculated from first control information calculation unit 226 and the second control information calculated from second control information calculation unit 227, and transmits the third control information to controller 222.

[Description of Flowchart]

Since there is no difference between control system 1A according to the second exemplary embodiment and control system 1 according to the first exemplary embodiment in terms of a flowchart for calculating the environmental information and a flowchart for calculating the work goal information, only the control operation of the robot will be described.

[Flow of Controlling Robot]

Figure 18:
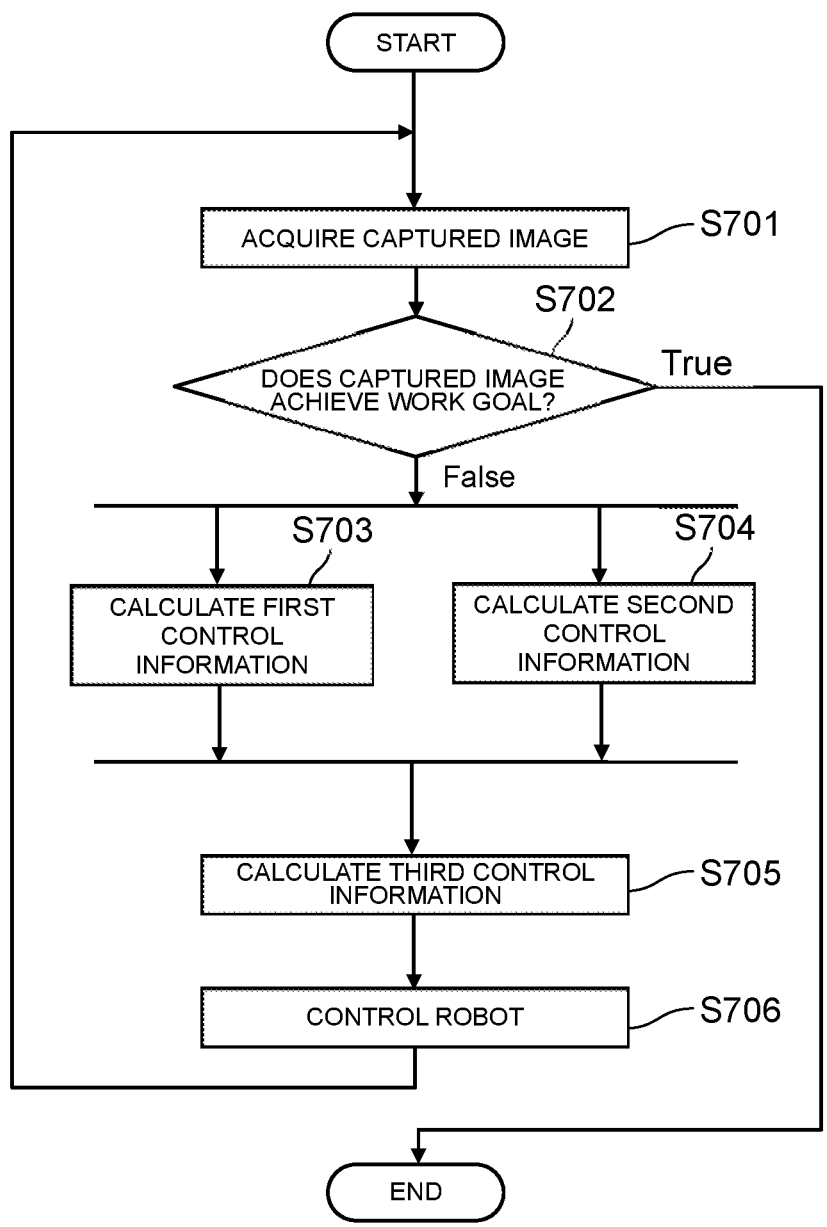
FIG. 18 is a flowchart illustrating a control operation of the robot according to the second exemplary embodiment.

FIG. 18 is a flowchart illustrating the control operation of the robot according to the second exemplary embodiment. The robot is controlled after the environmental information and the work goal information are calculated.

First, processor 22A acquires a captured image from image information acquisition unit 221, and calculates first image information by first image processing and second image information by second image processing (S701). Unlike the first exemplary embodiment, in the second exemplary embodiment, both the first image information and the second image information are constantly calculated from the captured image.

After step S701, processor 22A determines whether or not the captured image achieves a work goal (S702). In step S702, discrimination may be performed as in step S510 of the first exemplary embodiment.

In a case where the captured image achieves the work goal in step S702 (S702: True), the control is ended.

In a case where the captured image does not achieve the work goal in step S702 (S702: False), processor 22A simultaneously performs processing of a first step (S703) and processing of a second step (S704), and does not perform processing of a third step (S705 and S706) until the processing of the first step (S703) and the processing of the first step (S703) are ended.

After step S702, processor 22A calculates first control information based on environmental information, first work goal information, and first image information (S703). Step S703 may be calculated as in step S502 of the first exemplary embodiment.

After step S702, processor 22A calculates second control information based on second work goal information and second image information (S704). Step S704 may be calculated as in step S507 of the first exemplary embodiment.

After steps S703 and S704, processor 22A calculates third control information based on the first control information and the second control information (S705). For example, the third control information may be obtained by a weighted sum of the first control information and the second control information. For example, when the second control information is not obtained, the first control information may be used as it is as the third control information. For example, in the third control information, as an error between the second work goal information and the second image information is smaller, a weight of the second control information may be increased.

As described above, the first control information and the second control information are used, and thus, it is possible to perform control in which a point that control can be performed in a case where the work object is not present in the image captured by the camera, which is an advantage of the first control information and a point that control can be performed with high accuracy, which is an advantage of the second control information are combined. The above contents are realized by two-stage control in the first exemplary embodiment, whereas control without a hierarchical structure can be performed in the second exemplary embodiment.

After step S705, controller 222 controls robot 10 by using the calculated second control information (S706). After step S706, the processing returns to step S701.

[Effects and the Like]

As described above, in the present exemplary embodiment, the environmental information and the target image information are calculated in advance, the third control information is calculated based on the first control information calculated based on the environmental information and the second control information calculated based on the environmental information, and the control by the third control information is executed.

As a result, even in a case where the work object is not present in the image captured by the camera, the work can be executed while ensuring accuracy. Thus, it is possible to control the robot and cause the robot to perform the work without strictly designing the peripheral environment of the robot.

Other Exemplary Embodiments

The first and second exemplary embodiments have been described above as illustrations of the techniques disclosed in the present application. However, the techniques in the present disclosure are not limited to the above exemplary embodiments, and can also be applied to exemplary embodiments in which change, substitution, addition, omission, and the like are performed. Furthermore, a new exemplary embodiment can be made by combining the component elements described in the first exemplary embodiment and the second exemplary embodiment.

In the first and second exemplary embodiments, the features of the captured image are the set of coordinate points in the two-dimensional image. However, other examples can be considered. For example, in the case of a line, the features are a set of pairs of coordinates of a start point and an end point of the two-dimensional image. For example, in the case of an ellipse, the features are a set of pairs of center coordinates and vectors of a major axis and a minor axis of the ellipse of the two-dimensional image. For example, in the case of a rectangle, the features are a set of pairs of coordinates of a certain point in the two-dimensional image and two vectors. For example, in the case of a rectangular parallelepiped, the features are a set of pairs of coordinates of a certain point in the two-dimensional image and three vectors. Furthermore, these examples may be used in combination. As described above, a planar figure and a three-dimensional figure can be finally displayed as a set of parameters of points or lines. Furthermore, it can also be indicated by parameters such as color of the image and luminance of the image. Accordingly, the features of the captured image can be indicated by a set of parameters indicating the features in the two-dimensional image.

In the first and second exemplary embodiments, the features of the environmental information is a set of coordinate points in the three-dimensional space. However, other examples can be considered. For example, in a case where a line is used as the environmental information, the environmental information can be indicated by a set of pairs of a start point and an end point of the three-dimensional space. For example, in a case where an ellipse is used as the environmental information, the environmental information can be indicated by a set of pairs of center coordinates of the ellipse in the three-dimensional space and vectors of a major axis and a minor axis. For example, in a case where a rectangle is used as the environmental information, the environmental information can be indicated by a set of pairs of coordinates of a certain point in the three-dimensional space and two vectors. For example, in a case where a rectangular parallelepiped is used as the environmental information, the environmental information can be indicated by a set of pairs of coordinates of a certain point in the three-dimensional space and three vectors. Furthermore, these examples may be used in combination. As described above, a planar figure and a three-dimensional figure can be finally displayed as a set of parameters of points or lines. Furthermore, it can also be indicated by parameters obtained by projecting the color of the image, the luminance of the image, and the like onto the three-dimensional space. Accordingly, the environmental information can be indicated by a set of parameters indicating the features in the three-dimensional space.

In the first and second exemplary embodiments, the first work goal information and the first work information are the position and posture of the camera. However, the first work goal information and the first work information may be calculated from the environmental information and the first target image information or the first image information. For example, the first work goal information and the first work information are relative positions of the work object as viewed from the position of the camera. For example, the features include a position out of the imaging range as viewed from the position of the camera.

In the first and second exemplary embodiments, the second work goal information and the second work information are a set of coordinate points in the captured image. However, the second work goal information and the second work information may be calculated from the second target image information or the second image information. For example, the second work goal information and the second work information are the position and posture of the work object in the image. For example, the second work goal information and the second work information are combinations of the features of the work object and the position and posture in the image.

In the first and second exemplary embodiments, the environmental information is calculated before the control. However, the environment may fluctuate during the control, and a difference may occur between an actual environment and the calculated environmental information. Thus, the environmental information may be adapted to the actual environment by updating the environmental information by using the captured image.

In the first exemplary embodiment and the second exemplary embodiment, the work goal information is calculated before the control. However, it is conceivable to execute another work during the control, or to adjust the work goal information to a change in the environment. Thus, the work goal information may be dynamically changed to the work goal information according to a work desired to be executed or the actual environment.

In the first exemplary embodiment and the second exemplary embodiment, the camera is used as the sensor. However, a sensor other than the camera may be used as long as the environment information can be acquired. For example, a case where a depth sensor is used as the sensor is considered. In a case where the depth sensor is used, a portion having a large change in depth is extracted as the first image processing. As a result, the features of the environment corresponding to the pattern of the environment as in the first exemplary embodiment can be calculated. A portion having an elliptical depth shape is extracted as the second image processing. As a result, the features of the work object corresponding to a hole of bolt hole 11 as in the first exemplary embodiment is extracted. The environmental information expresses the features of the depth information extracted as the three-dimensional point group by the first image processing. The work goal information uses information extracted by the first image processing and the second image processing by using the depth information acquired in the target state of the robot. It is possible to perform control similarly to the contents described in the first exemplary embodiment and the second exemplary embodiment by processing the depth information and using the depth information as the feature.

In the first exemplary embodiment, there is provided the robot control method in the control device connected to the robot that performs the work on the work object and the sensor that is mounted on the robot. The robot control method includes calculating the environmental information indicating the peripheral environment of the robot based on the plurality of pieces of environment image information acquired at the plurality of positions and angles, acquiring the first image information by the camera, executing the first step of calculating the first control information causing the robot to approach the work goal of the robot for the work object based on the work goal information indicating the work goal, the environmental information, and the first image information, and transmitting the first control information to the robot, acquiring the second image information by the camera after the first step, and executing the second step of calculating the second control information causing the robot to approach the work goal based on the work goal information and the second image information and transmitting the second control information to the robot. According to the first step, even in a case where the work object is not captured in the captured image, the control can be performed by using the environmental information. Furthermore, highly accurate control based on the captured image can be performed by the second step.

After the first step is executed, image information is acquired by the camera, and in a case where it is determined that the work object is not present in the image information, the first step is executed based on the image information. In the first step, the control is executed such that the first work information approaches the first work goal information. Here, the first work goal information includes the information on the work object. Accordingly, since the control is executed from when the information on the work object is not present in the image information to when the information on the work object is present, the second step can be executed.

After the first step is executed, image information is acquired by the camera, and in a case where it is determined that the robot does not meet the work goal based on the environmental information and the image information, the first step is executed. As a result, in a case where the work goal cannot be achieved by one control, control for achieving the work goal can be performed by performing the control to approach the work goal again.

After the second step is executed, the camera acquires image information, and in a case where it is determined that the robot does not meet the work goal based on the image information, the second step is executed. As a result, in a case where the work goal cannot be achieved by one control, the work goal can be achieved by performing control to approach the work goal again.

After the second step is executed, the image information is acquired by the camera, and in a case where the work object is not present within a certain range of the current image information, the first step is executed. As a result, even in a case where the work object is lost during the second step, the control can be performed to recapture the work object by returning to the first step.

The work goal information includes feature information of the work object when the work is ended, the environmental information includes pieces of three-dimensional positional information corresponding to the pieces of feature information of the work object and the work table present in the environment corresponding to the feature information including the work object and the work table, and the first image information includes feature information of at least one of the work object and the work table at an acquisition point of time.

The three-dimensional positional information has an expression specific to an object, including a parameter indicating a point, a line, or a planar figure, or a parameter indicating a three-dimensional figure.

The work goal information includes the feature information of the work object when the work is executed, and the second image information includes the feature information of the work object at an acquisition point of time.

The work goal information includes the feature information of the work object when the work is executed.

The feature information has an expression specific to an object including a parameter indicating a point, a line, or a planar figure, or a parameter indicating a three-dimensional figure.

The environmental information is updated by using the first image information and the second image information. As a result, even in a case where the environment changes, it is possible to perform control adapted to the environment by updating the environmental information.

The environment image information is the captured image captured by the camera.

In the second exemplary embodiment, there is provided the robot control method in the control device connected to the robot that performs the work on the work object and the sensor that is mounted on the robot. The robot control method includes calculating the environmental information indicating the peripheral environment of the robot based on the plurality of pieces of environment image information obtained by capturing the peripheral environment of the robot at the plurality of positions and angles, acquiring the first image information and the second image information by using the camera, executing the first step of calculating the first control information causing the robot to approach the work goal of the robot for the work object based on the work goal information indicating the work goal, the environmental information, and the first image information, executing the second step of calculating the second control information causing the robot to approach the work goal based on the work goal information and the second image information, and executing the third step of calculating the third control information based on the first control information and the second control information and transmitting the third control information to the robot. As a result, it is possible to perform control such that control can be performed even in a case where the work object is not captured in the first step, highly accurate control information for the work object is calculated in the second step, and drawbacks are compensated by combining the first step and the second step in the third step.

After the third step is executed, in a case where it is determined that the robot does not meet the work goal, the fourth control information causing the robot to approach the work goal is calculated based on the work goal information, the environmental information and the third image information acquired by using the camera, the fifth control information causing the robot to approach the work goal is calculated based on the work goal information and the fourth image information acquired by using the camera, the sixth control information is calculated based on the fourth control information and the fifth control information, and the sixth control information is transmitted to the robot. As a result, in a case where the work goal cannot be achieved by one control, the work goal can be achieved by performing control to approach the work goal again.

Note that the exemplary embodiments described above are to exemplify the techniques in the present disclosure, and thus, various modifications, replacements, additions, omissions, and the like can be made in the scope of claims or in an equivalent scope thereof.

The present disclosure is applicable to a control device that adapts to various environments and performs a work by a robot. Specifically, the present disclosure can be applied to an assembly work of a factory, an arrangement work of a warehouse, a delivery and unloading work of a backyard, and the like.

What is claimed is:

1. A robot control method in a control device connected to a robot that performs a work on a work object and a camera that is mounted on the robot, the method comprising:
   calculating environmental information indicating a peripheral environment of the robot, the environmental information including three-dimensional-position information corresponding to pieces of feature information of the work object and pieces of feature information of a peripheral object present in the peripheral environment of the robot, based on a plurality of pieces of a captured image captured by the camera at a plurality of positions and angles;
   acquiring first sensor information by the camera, the first sensor information including the feature information of the work object and the feature information of the peripheral object in a first image captured at a first acquisition time;
   executing a first step of calculating first control information causing the robot to approach a work goal of the robot for the work object based on first work goal information indicating a target position and posture of the camera, the environmental information, and the first sensor information, and controlling the robot based on the first control information; and acquiring second sensor information by the camera after the first step, the second sensor information including the feature information of the work object in a second image captured at a second acquisition time; and executing a second step of calculating second control information causing the robot to approach the work goal based on second work goal information and the second sensor information, the second work goal information indicating a position and posture of the work object in the second image, and controlling the robot based on the second control information.

2. The robot control method according to claim 1, wherein third sensor information is acquired by the sensor after the first step is executed, and the first step is executed in a case where it is determined that the work object is not present based on the third sensor information.

3. The robot control method according to claim 1, wherein third sensor information is acquired by the sensor after the first step is executed, and the first step is executed in a case where it is determined that the robot does not meet the work goal based on the environmental information and the third sensor information.

4. The robot control method according to claim 1, wherein fourth sensor information is acquired by the sensor after the second step is executed, and the second step is executed in a case where it is determined that the robot does not meet the work goal based on the fourth sensor information.

5. The robot control method according to claim 1, wherein fourth sensor information is acquired by the sensor after the second step is executed, and the first step is executed in a case where it is determined that the work object is not present based on the fourth sensor information.

6. The robot control method according to claim 1, wherein the three-dimensional positional information has an expression specific to an object including a parameter indicating a point, a line, or a planar figure, or a parameter indicating a three-dimensional figure.

7. The robot control method according to claim 1, wherein the feature information has an expression specific to an object including a parameter indicating a point, a line, or a planar figure, or a parameter indicating a three-dimensional figure.

8. The robot control method according to claim 1, wherein the environmental information is updated by using the first sensor information.

9. A robot control method in a control device connected to a robot that performs a work on a work object and a camera that is mounted on the robot, the method comprising:

calculating environmental information indicating a peripheral environment of the robot, the environmental information including three-dimensional-position information corresponding to pieces of feature information of the work object and pieces of feature information of a peripheral object present in the peripheral environment of the robot, based on a plurality of pieces of a captured image captured by the camera at a plurality of positions and angles;

acquiring first sensor information and second sensor information by using the camera, the first sensor information including the feature information of the work object and the feature information of the peripheral object in a first image captured at a first acquisition time, and the second sensor information including the feature information of the work object in a second image captured at a second acquisition time;

executing a first step of calculating first control information causing the robot to approach a work goal of the robot for the work object based on first work goal information indicating a target position and posture of the camera, the environmental information, and the first sensor information;

executing a second step of calculating second control information causing the robot to approach the work goal based on second work goal information and the second sensor information, the second work goal information indicating a position and posture of the work object in the second image; and executing a third step of calculating third control information based on the first control information and the second control information, and controlling the robot based on the third control information.

10. The robot control method according to claim 9, wherein, in a case where it is determined that the robot does not meet the work goal after the third step is executed, fourth control information causing the robot to approach the work goal is calculated based on the work goal information, the environmental information, and third sensor information acquired by using the sensor, fifth control information causing the robot to approach the work goal is calculated based on the work goal information and fourth sensor information acquired by using the sensor, and sixth control information is calculated based on the fourth control information and the fifth control information, and the sixth control information is transmitted to the robot.

* * * * *